US010682836B2

(12) United States Patent
Matz et al.

(10) Patent No.: US 10,682,836 B2
(45) Date of Patent: Jun. 16, 2020

(54) MACHINES FOR TRANSFERRING A PREFORMED FUNCTIONAL FILM ONTO AN OPHTHALMIC SUBSTRATE AND METHOD FOR PRODUCING AN OPHTHALMIC LENS COMPRISING A METHOD FOR TRANSFERRING THE PREFORMED FILM ONTO THE SUBSTRATE

(71) Applicant: Essilor International, Charenton-le-Pont (FR)

(72) Inventors: Michel Matz, Charenton le Pont (FR); Herve Gentils, Charenton le Pont (FR); Jean-Marc Tridon, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 16/078,346

(22) PCT Filed: Feb. 17, 2017

(86) PCT No.: PCT/FR2017/050369
§ 371 (c)(1),
(2) Date: Aug. 21, 2018

(87) PCT Pub. No.: WO2017/144802
PCT Pub. Date: Aug. 31, 2017

(65) Prior Publication Data
US 2019/0077139 A1 Mar. 14, 2019

(30) Foreign Application Priority Data
Feb. 22, 2016 (FR) ...................................... 16 51441

(51) Int. Cl.
*B32B 37/00* (2006.01)
*B29D 11/00* (2006.01)
(Continued)

(52) U.S. Cl.
CPC ...... *B32B 37/0007* (2013.01); *B29C 65/7858* (2013.01); *B29D 11/0073* (2013.01);
(Continued)

(58) Field of Classification Search
CPC .......... B29D 11/0073; B29D 11/00865; B29D 11/00009; B32B 2551/00; B32B 37/0007;
(Continued)

(56) References Cited

U.S. PATENT DOCUMENTS 3,322,598 A 5/1967 Marks et al.
4,707,208 A 11/1987 Crumbach et al.
(Continued)

OTHER PUBLICATIONS

International Search Report dated Jun. 14, 2017 in PCT/FR2017/050369 filed Feb. 17, 2017.

*Primary Examiner* — Sonya M Sengupta
(74) *Attorney, Agent, or Firm* — Oblon, McClelland, Maier & Neustadt, L.L.P.

(57) ABSTRACT

A machine for transferring a preformed functional film onto a curved face of an ophthalmic substrate, including: a first device for receiving and holding the substrate; a second device for receiving the film, the first device and/or second device configured to hold the film by applying a pressure force to the periphery thereof; a first mechanism for moving the devices, configured to place the curved face such that it faces the film, a second mechanism for moving the devices, configured to bring into contact the center of the film with the center of the curved face and to apply the film with the substrate to radially spread, from the center of the film up to the periphery thereof, a conformal contact between the film and the curved face; and a control and command unit configured to control at least the second mechanism when the film and the substrate are in contact.

18 Claims, 12 Drawing Sheets

(51) Int. Cl.
- B32B 37/18 (2006.01)
- B32B 38/18 (2006.01)
- B32B 38/00 (2006.01)
- B29C 65/78 (2006.01)
- B29C 65/20 (2006.01)
- B29C 65/18 (2006.01)
- B29C 65/00 (2006.01)
- B65B 7/16 (2006.01)
- B29L 11/00 (2006.01)
- B65B 25/00 (2006.01)
- G02C 7/04 (2006.01)
- B65B 7/28 (2006.01)

(52) U.S. Cl.
CPC .... *B29D 11/00865* (2013.01); *B32B 37/0046* (2013.01); *B32B 37/18* (2013.01); *B32B 38/0036* (2013.01); *B32B 38/1866* (2013.01); *B29C 65/18* (2013.01); *B29C 65/20* (2013.01); *B29C 66/242* (2013.01); *B29C 66/244* (2013.01); *B29C 66/53461* (2013.01); *B29C 66/7352* (2013.01); *B29C 66/8122* (2013.01); *B29C 66/8161* (2013.01); *B29C 66/81457* (2013.01); *B29C 66/8322* (2013.01); *B29C 66/919* (2013.01); *B29C 66/929* (2013.01); *B29L 2011/00* (2013.01); *B29L 2011/0041* (2013.01); *B32B 2551/00* (2013.01); *B65B 7/164* (2013.01); *B65B 7/2878* (2013.01); *B65B 25/008* (2013.01); *B65D 2585/545* (2013.01); *G02C 7/04* (2013.01)

(58) Field of Classification Search
CPC . B32B 37/0046; B32B 37/18; B32B 38/0036; B32B 38/1866; B29C 66/8122; B29C 65/18; B29C 65/20; B29C 66/242; B29C 66/244; B29C 66/53461; B29C 66/7352; B29C 66/81457; B29C 66/8161; B29C 66/8322; B29C 66/849; B29C 66/919; B29C 66/929; B29C 65/7858; G02C 7/04; B65B 25/008; B65B 7/164; B65B 7/2878; B29L 2011/00; B29L 2011/0041; B29L 2031/7164; B65D 2585/545
USPC .................. 156/228, 295, 362, 381, 581
See application file for complete search history.

(56) References Cited

U.S. PATENT DOCUMENTS

| | | | |
|---|---|---|---|
| 9,283,717 B2* | 3/2016 | Jiang | B29D 11/00125 |
| 2009/0308542 A1* | 12/2009 | Baranton | B29C 65/4845 |
| | | | 156/580 |
| 2010/0193112 A1 | 8/2010 | Bovet et al. | |
| 2012/0013979 A1 | 1/2012 | Biteau | |

* cited by examiner

Fig. 5
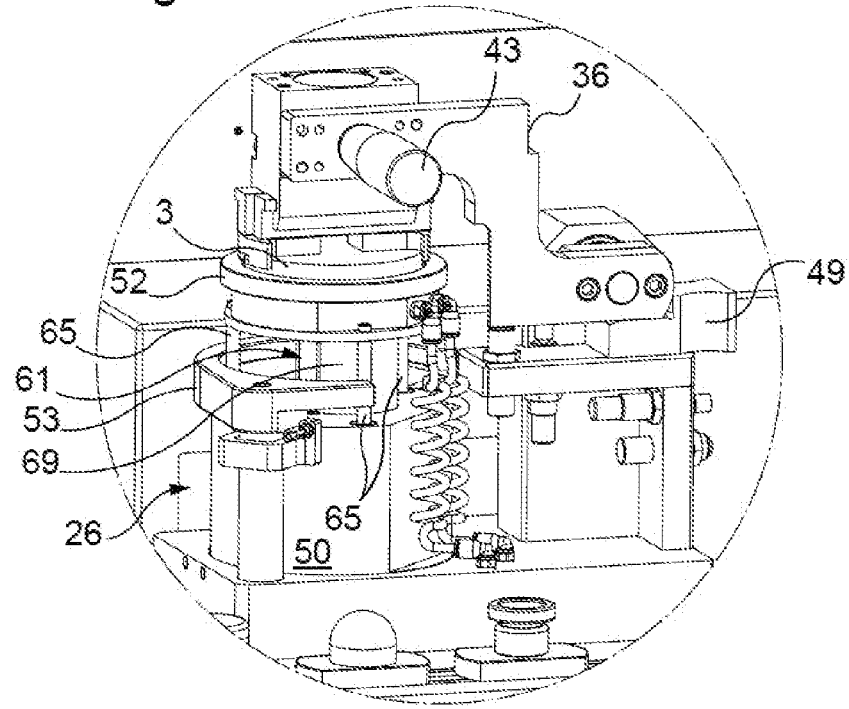
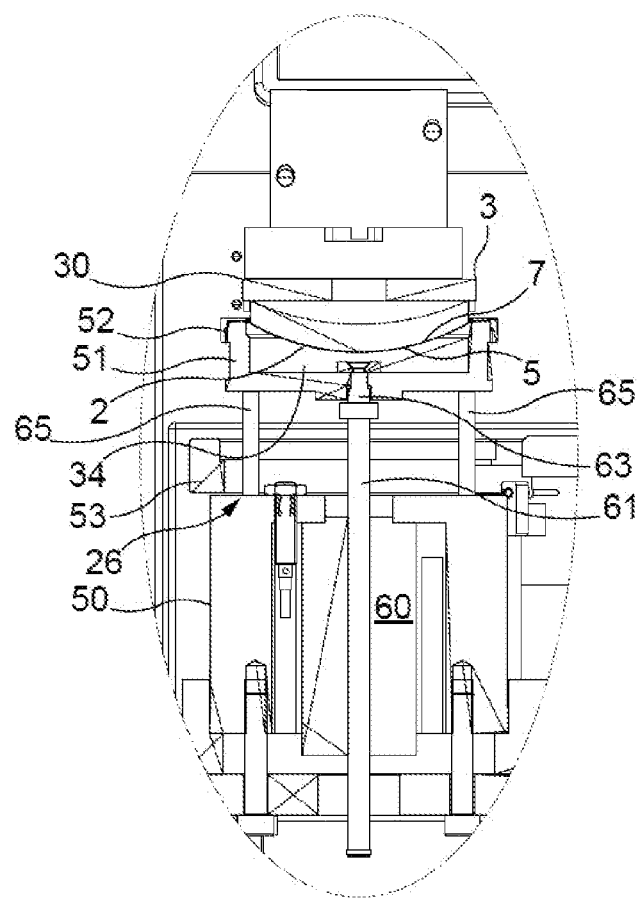
Fig. 6

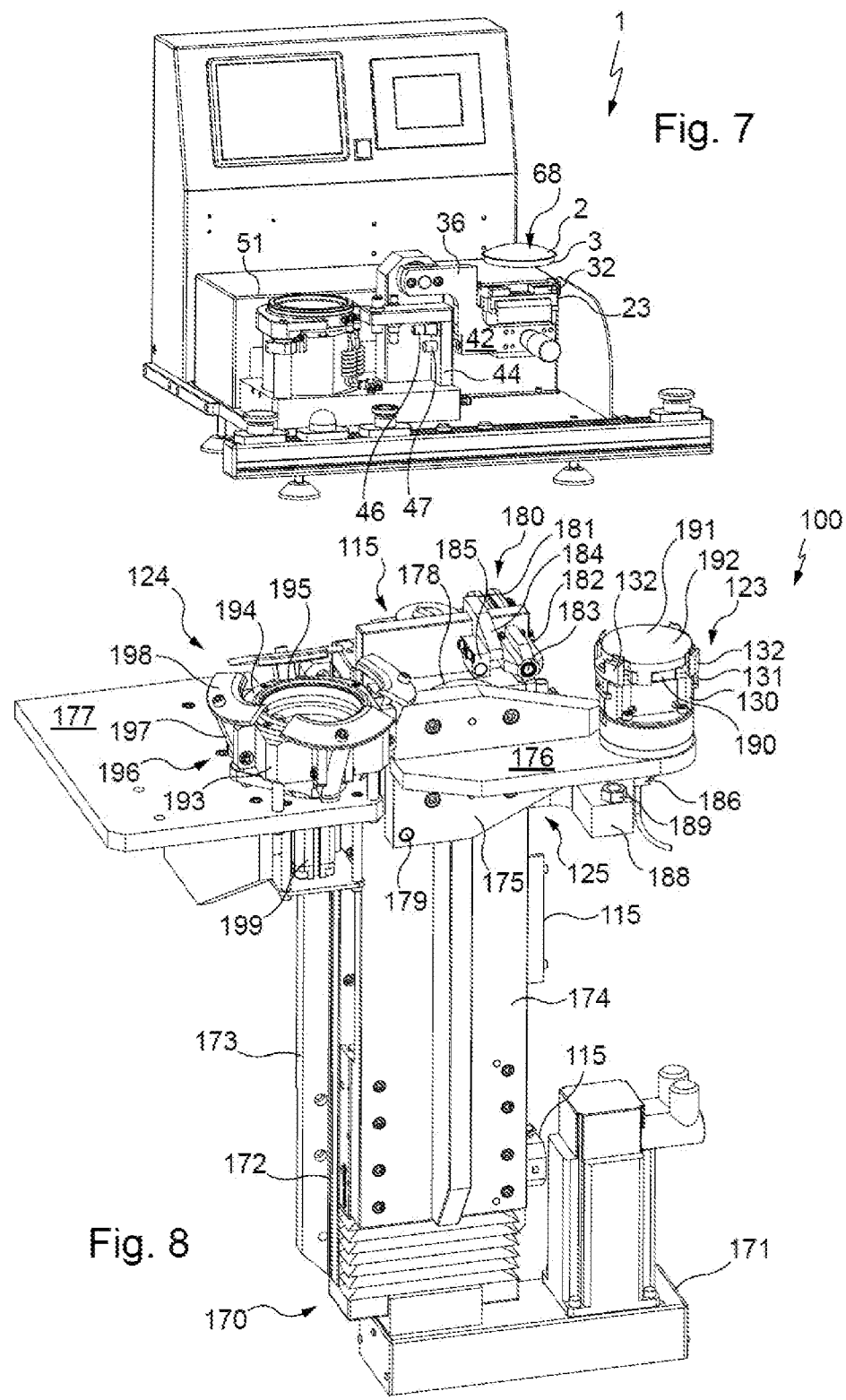

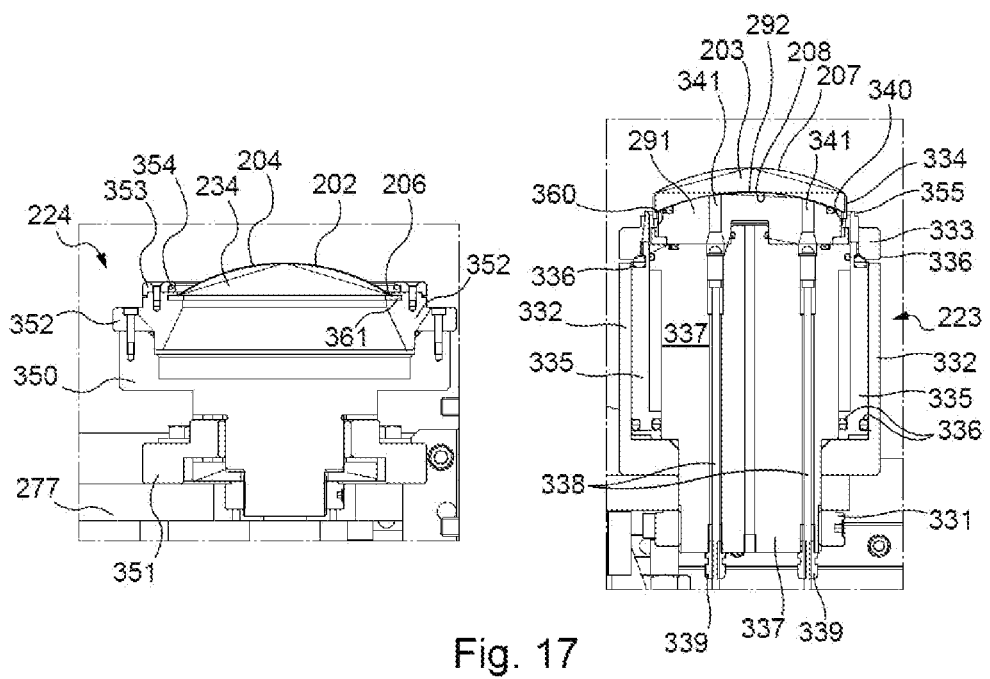
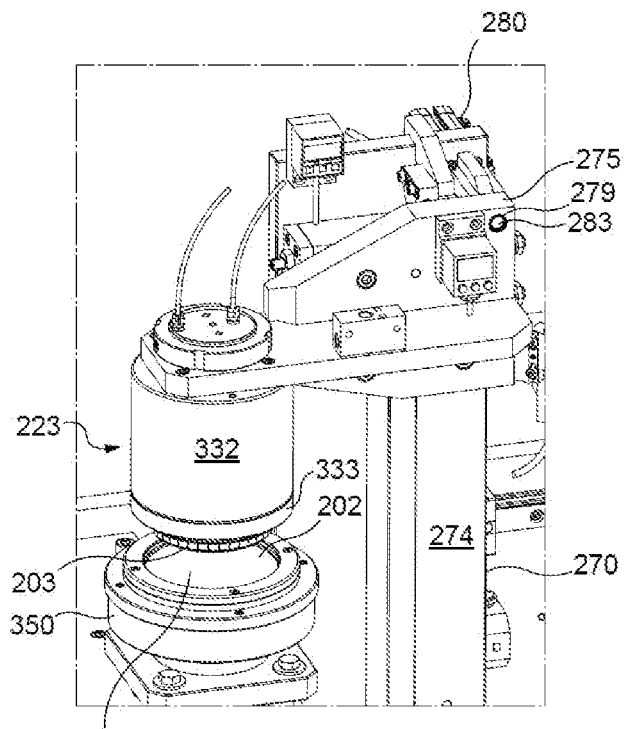

MACHINES FOR TRANSFERRING A PREFORMED FUNCTIONAL FILM ONTO AN OPHTHALMIC SUBSTRATE AND METHOD FOR PRODUCING AN OPHTHALMIC LENS COMPRISING A METHOD FOR TRANSFERRING THE PREFORMED FILM ONTO THE SUBSTRATE

FIELD OF THE INVENTION

The invention relates to the manufacture of ophthalmic lenses that comprise a substrate and a preformed functional film securely fastened to a curved face of said substrate.

The invention is aimed in particular at machines for transferring such a preformed functional film onto such a substrate, and at the methods for manufacturing such lenses, comprising a transfer method performed using such a machine.

PRIOR ART

It is known that the functional films used to coat ophthalmic lenses are sometimes flat in their initial state, for reasons of ease of manufacture of these films; and methods for transferring an initially flat functional film to a curved face of a substrate are already known.

In these methods, to prevent defects appearing in the film, the film is preformed using a cold, or preferably hot (thermoforming), method to give it an appropriate initial curvature, before being applied to the substrate.

In particular, French patent application 2 883 984, to which US 2008/0314499 is the corresponding United States patent application, proposes positioning the substrate having a curved face on a substrate holder inside a chamber; positioning the flat functional film on a film holder at the upper end of the chamber in order to close this chamber; positioning the chamber vertically in line with a flexible stamp so that their respective geometric centers are aligned; then preforming the functional film by applying the flexible stamp to the film, and thus thermoforming the film.

Furthermore, it is then proposed for the chamber to be placed under negative pressure causing the substrate and the thermoformed functional film to come into contact via their respective geometric centers on the curved-face side of the substrate, and for the flexible stamp to be translated vertically, establishing a conformal contact between the functional film and the substrate on its curved-face side.

French patent application 2 918 917, to which US 2010/0193112 is the corresponding United States patent application, itself proposes to implement a similar transfer method, but in which the direct immobilization of the film by the film holder along an annular perimeter is replaced by the immobilization of an initially flat deformable auxiliary membrane, on one face of which the functional film is retained by a binding layer configured so that the shape of the functional film varies conformally to the deformation of the membrane, the functional film then remaining parallel to the auxiliary membrane, only the auxiliary membrane being held by the film holder at its perimeter, the functional film being held in contact with the auxiliary membrane only by the binding layer.

The implementation of the transfer method described in French patent application 2 918 917 is carried out:

as in French patent application 2 883 984, i.e. a flexible stamp is used to preform the functional film, giving it a curvature the convexity of which is turned towards the curved face of the substrate; the center of the convex face of the functional film is brought into contact with the center of the convex curved face of the substrate; and then the functional film is applied with the flexible stamp by inverting its curvature in order to diffuse, radially from the center of the functional film as far as its periphery, the conformal contact between the functional film and the substrate; or as a variant, a flexible stamp is not used and the negative pressure in the chamber is replaced by a positive pressure that is used to preform the functional film, thereby giving it a curvature the concavity of which is turned toward the curved face of the substrate; the center of the concave face of the functional film is brought into contact with the center of the convex curved face of the substrate; and then the film is applied, without inverting its curvature, by driving the substrate toward the film, in order to spread, radially from the center of the film as far as its periphery, the conformal contact between the functional film and the substrate.

In the transfer method described in French patent application 2 918 917, since the functional film is not held at all at its periphery by mechanical means, it can slide over the membrane while the deformation is generated, thus decreasing the stresses that are created in the functional film.

SUBJECT OF THE INVENTION

The invention seeks to make it possible to manufacture an ophthalmic lens using such transfer in instances in which the functional film is preformed beforehand.

To that end the invention, in a first aspect, proposes a machine for transferring a preformed functional film onto a curved face of an ophthalmic substrate, characterized in that it comprises:

a first receiving device configured to receive and hold said substrate in a first predetermined position;

a second receiving device, distinct from said first receiving device and configured to receive said preformed functional film in a second predetermined position; with said first receiving device and/or said second receiving device also being configured to hold said preformed functional film in its second predetermined position and to apply a predetermined pressure force, for example substantially evenly distributed, to the entire perimeter of said functional film;

a first movement mechanism for moving at least one of said first and second receiving devices, configured to place said curved face of said ophthalmic substrate facing said preformed functional film, with the respective geometric centers of said ophthalmic substrate and of said preformed functional film aligned;

a second movement mechanism for moving at least one of said first and second receiving devices, configured to bring the center of said preformed functional film into contact with the center of said curved face of said substrate and then apply said functional film to said ophthalmic substrate in such a way as to spread, radially from the center of said functional film to the periphery thereof, a conformal contact between said functional film and said curved face of said substrate; and a command and control unit configured to control at least said second movement mechanism when said functional film and said ophthalmic substrate are in contact.

By virtue of the two distinct receiving devices, the position of the substrate and the position of the film in these devices are assured in a way that is simple, convenient and reliable. The substrate and the film are also positioned on the respective receiving devices independently of one another. The first movement mechanism itself allows the positions of the film and of the substrate to be centered relative to one another, by aligning their geometric centers.

The uniform and even distribution of the forces applied to the perimeter of the preformed film on its own, namely without an associated membrane, ensures a uniform and even (isotropic) distribution of the stresses applied to the entire surface of the film held during application of the film to the substrate.

It will be noted that the magnitude of the forces applied to the perimeter of the preformed film may for example be of the order of around 5 bar.

What is more, the controlled movement of the two distinct receiving devices relative to one another in order to bring the film into contact with the substrate and apply it thereto allows progressive and controlled lamination of the film and of the substrate, thereby limiting the generation of heterogeneous (anisotropic) stresses in the film.

The machine according to the invention therefore makes it possible to transfer the preformed film onto the substrate in a way that is particularly simple, convenient and effective.

It will be noted that the functional film may be configured so as to offer an impact-resistance function, an anti-scratch function, a reflection function such as an anti-reflective or mirror function, a polarizing function, a filtering function making it possible to modulate the transmission curve, this filtering being selective or non-selective, a photochromic function, an electrochromic function, an anti-static function, an anti-smudge function, an anti-fog function or even a water-repellent function, a bonding function or a combination of one or more of these functions.

It will also be noted that the ophthalmic substrate may be what is known as a finished substrate, namely a substrate which has two opposite faces which have ophthalmic properties referred to as prescription properties, or a substrate known as a semi-finished substrate, namely one which has two opposite faces, only one of these two comprising ophthalmic properties known as prescription properties whereas the other face does not (and may be what is known as an unfinished face).

Alternatively, the substrate may be the support of a non-prescription ophthalmic lens, generally defined as a plano lens used for example to make non-corrective sunglasses. Where appropriate, the substrate may intrinsically include a predetermined function, for example a filtering function.

It may also be noted that the curved face of the substrate, to which the preformed film is applied, may be concave or convex.

The assembly comprising the substrate and the film applied to this substrate therefore forms an assembly that forms a (corrective or non-corrective) ophthalmic lens.

The transferral of the film is mentioned here as being performed directly onto the curved face of the substrate. Within the context of the invention, it must be understood that the curved face of the substrate is either bare, or may already have an initial film or an initial coating, or even several; meaning that the film that is transferred may be brought into contact with an initial film/coating on the substrate.

Such an initial film/coating is applied to at least one of the faces of the substrate and is configured to confer upon it at least one function chosen for example from among those mentioned hereinabove regarding the preformed functional film that is being transferred.

The transfer machine according to the invention is particularly advantageous when the ophthalmic lens thus formed needs to undergo a heat treatment subsequent to the transferral. Specifically, during the heat treatment of such an assembly that makes up the lens, the temperature of the substrate increases and, when its temperature approaches a glass transition temperature of the material from which the substrate is made, the latter softens so that it then puts up little if any resistance to any residual stress present in the assembly (film/substrate) formed. The softness of the substrate means that the residual stresses present in the assembly can relax thus leading to a slight deformation of the substrate, for example a small amount of twisting. Such deformation may lead to a small optical defect or even to a small change in the optical function of the lens. Now, as indicated earlier, the machine according to the invention makes it possible to limit the formation of such stresses, particularly thanks to the accurate positioning and alignment of the film and of the substrate and also thanks to the controlled movement during application of the film.

According to certain advantageous features of the transfer machine, said second receiving device and said preformed functional film held in its second predetermined position delimit a first closed and sealed chamber, and said machine further comprises a system configured to generate a positive pressure difference within said first chamber in relation to its immediate surroundings, so as to place said preformed functional film under tension.

The increase in pressure thus generated in the first chamber and the tension in the film as a result, mean that the same pressure can be applied to the entire surface of the film, thus evening the distribution of stress over this surface; with a view to limiting optical problems associated with distortion phenomena, notably those induced as the residual stresses relax during or following a subsequent heat treatment of the lens.

This increase in pressure may be considered as being an overpressurizing of the first chamber, at least in relation to the outside of the first chamber, or as the creation of a reduced pressure in the immediate surroundings of the first chamber, in comparison with this chamber.

The positive pressure difference (or overpressure) within said first chamber in relation to its immediate surroundings is, for example, comprised between 0.1 and 1 bar, preferably comprised between 0.1 and 0.5 bar, and more preferably still, equal to around 0.25 bar.

What is more, this positive pressure differential between the inside of the first chamber and its immediate surroundings may for example be generated before the film and the substrate come into contact.

Such a positive pressure differential may also be maintained through to the end of the transfer process or may be eliminated just before the film is applied to the substrate, by emptying the closed and sealed first chamber.

Said second receiving device may have a horizontal base on which the functional film rests along its perimeter and a clamping mechanism configured to apply said predetermined pressure force vertically and uniformly to said perimeter of said functional film.

Said clamping mechanism may be formed by a plurality of articulated arms each having an end gripper, configured to grip said perimeter of said functional film on said base; or by an at least partially annular member configured to be mounted so that it presses firmly against said base.

According to other features of the transfer machine, said first and second receiving devices are configured to keep said preformed functional film in its second predetermined position and to define, when said preformed functional film is facing said curved face of said substrate, a second closed and sealed chamber, said second chamber being delimited notably by said curved face of said substrate and one face of said preformed functional film which face faces toward said curved face of said substrate, and said machine further comprises a system configured to generate a negative pressure difference within said second chamber in relation to said first chamber.

This notably makes it possible to encourage the creation of conformal contact between said functional film and said curved face of said substrate as the preformed functional film is applied to the ophthalmic substrate, while at the same time minimizing tension stresses in the film.

It will be noted that the reduction in pressure in the second chamber may be considered as being the creation of a depression in comparison with the first sealed and closed chamber; and that the overpressure mentioned hereinabove may where appropriate be relative in relation to the pressure in the second sealed and closed chamber, the latter therefore forming the immediate surroundings of the first chamber.

The negative pressure difference within said second chamber in relation to said first chamber is, for example, comprised between 0.1 and 1 bar, preferably comprised between 0.1 and 0.5 bar, and more preferably still, equal to 0.25 bar.

What is more, it will be noted that the depression in the second chamber may be generated as a result of the overpressure generated in the first chamber or, on the other hand, the overpressure in the first chamber may be generated by the depression generated in the second chamber.

According to other features of the transfer machine, said second movement mechanism is configured to apply said functional film to said ophthalmic substrate by reversing the curvature of said functional film so as to spread, radially from the center of said functional film as far as the periphery thereof, the conformal contact between said functional film and said curved face of said substrate.

It will be noted that the reversal of the curvature (also referred to as inverting of shape) of the preformed film may occur when it has a convex face which is brought into contact with a likewise convex face of the substrate. Where appropriate, the fact that the film is held directly by its perimeter and the movement of the two receiving devices during application of the film to the substrate is controlled makes it possible to avoid the change (inversion) of curvature occurring too sharply (or quickly) and thus makes it possible to avoid the phenomenon of the film being said to slam onto the substrate. It will be noted that this slamming phenomenon is particularly limited in the machine according to the invention once the majority of the surface of the film in contact with the substrate has at least partially conformed to the surface of the latter.

According to other preferred, simple, practical and economical features of the machine according to the invention:

said first and second receiving devices are configured so that the curved face of said substrate and one face of said functional film intended to be applied to said curved face of said substrate face in the same axial direction when said substrate and said functional film are respectively in the first and second predetermined positions, before they are brought to face one another, and said first movement mechanism is configured to turn at least one of said first and second receiving devices over so as to position it facing the other of said first and second receiving devices and thus place said curved face of said ophthalmic substrate so that it faces said face of said preformed functional film that is intended to be applied to said curved face of said substrate;

at least one of said first and second receiving devices comprises a centering mechanism for automatically centering the substrate and/or the functional film in the first and/or the second predetermined position respectively;

said first receiving device comprises a counterform on which the substrate rests;

said substrate, on its curved face, has an initial layer formed of a material exhibiting adhesive properties;

said command and control unit and said second movement mechanism are configured to apply said functional film to said ophthalmic substrate at a constant predetermined closing speed between the first and second receiving devices, notably a closing speed of the order for example of 0.05 to 20 millimeters/second, preferably of the order of 0.3 to 0.5 millimeters/second; and/or said command and control unit and said second mechanism are configured to apply in said first chamber a pressure for example comprised between 0 and 5 bar, preferably comprised between 1.5 and 3.5 bar for a duration for example comprised between 30 seconds and 10 minutes; with a view to keeping the film pressed against the substrate after lamination and also to begin the intrinsic process of these elements bonding together.

The invention also proposes, in a second aspect, a method for manufacturing an ophthalmic lens comprising a substrate and a functional film which is preformed and bonded to a curved face of said substrate, said method of manufacture comprising a method for transferring said preformed functional film which is carried out using a transfer machine like the one described hereinabove, said transfer method comprising the following steps:

mounting and holding said substrate in a first predetermined position on a first receiving device of said machine;

mounting said preformed functional film in a second predetermined position on a second receiving device of said machine and holding it while applying a predetermined and, for example, substantially evenly distributed, pressure force, to the entire perimeter of said functional film thanks to said first receiving device and/or to said second receiving device;

positioning the curved face of said substrate to face said preformed functional film with a first movement mechanism that moves at least one of said first and second receiving devices of said machine, with the respective geometric centers of the substrate and of said preformed functional film aligned;

bringing the center of said preformed functional film into contact with the center of said curved face of said substrate; and applying said functional film to said ophthalmic substrate in such a way as to spread, radially from the center of said functional film as far as the periphery thereof, conformal contact between said functional film and said curved face of said substrate, using a second movement mechanism of at least one of said first and second receiving devices of said machine; said bringing-into-contact and said application being controlled by a command and control unit of said machine.

According to preferred, simple, practical and economical features of the method according to the invention:

said second receiving device and said preformed functional film held in its second predetermined position delimit a first closed and sealed chamber, and said transfer method comprises a step of generating a positive pressure difference within said first chamber in relation to its immediate surroundings, so as to place said preformed functional film under tension;

the positive pressure difference within said first chamber in relation to its immediate surroundings is, for example, comprised between 0.1 and 1 bar, preferably comprised between 0.1 and 0.5 bar, and more preferably still, equal to around 0.25 bar;

said second receiving device has a horizontal base on which said functional film rests along its perimeter and the step of holding said functional film in its second predetermined position is performed by applying said predetermined pressure force vertically to said perimeter of said functional film with a mechanism for clamping said second receiving device;

said first and second receiving devices are configured to keep said preformed functional film in its second predetermined position and to define, when said preformed functional film is facing said curved face of said substrate, a second closed and sealed chamber, delimited notably by said curved face of said substrate and one face of said preformed functional film which face faces toward said curved face of said substrate, and said transfer method comprises a step of generating a negative pressure difference within said second chamber in relation to said first chamber;

the negative pressure difference within said second chamber in relation to said first chamber is, for example, comprised between 0.1 and 1 bar, preferably comprised between 0.1 and 0.5 bar, and more preferably still, equal to around 0.25 bar;

the step of applying said film to said substrate is performed by reversing the curvature of said functional film so as to spread, radially from the center of said functional film as far as the periphery thereof, the conformal contact between said functional film and said curved face of said substrate;

the steps of mounting said substrate and said functional film respectively on the first and second receiving devices are performed in such a way that said curved face of said substrate and one face of said functional film intended to be applied to said curved face of said substrate face in the same axial direction, and the step of placing said curved face of said ophthalmic substrate so that it faces said face of said preformed functional film that is intended to be applied to said curved face of said substrate is performed by inverting at least one of said first and second receiving devices;

the step of applying said film to said substrate is performed in a controlled manner at a constant predetermined closing speed between the first and second receiving devices, notably a closing speed of the order for example of 0.05 to 20 millimeters/second, preferably of the order of 0.3 to 0.5 millimeters/second;

the method of manufacture comprises, after said step of applying said functional film to said ophthalmic substrate, a step of applying, within said first chamber, a pressure for example comprised between 0 and 5 bar, preferably comprised between 1.5 and 3.5 bar, for a duration for example comprised between 30 seconds and 10 minutes;

the steps of said transfer method are all carried out at a temperature substantially equal to ambient temperature;

the method of manufacture further comprises a method for preforming said functional film, notably by thermoforming, in order to give said functional film a curvature before said transfer method is implemented;

the method of manufacture further comprises a heat treatment of said ophthalmic lens obtained at the end of said transfer method; and/or the method of manufacture comprises a step of selecting said preformed functional film from a plurality of preformed functional films, a step of selecting said ophthalmic substrate from a plurality of substrates and a step of supplying said transfer machine for implementing said method of transferring said selected preformed functional film onto said curved face of said selected substrate.

BRIEF DESCRIPTION OF THE DRAWINGS

The demonstration of the invention will now continue with a detailed description of embodiments thereof, given below by way of illustration and nonlimiting example, and with reference to the appended drawings, in which:

FIGS. 2 to 6 are partial views of the machine illustrated in FIG. 1, in perspective or in section, in various configurations of the machine, in order to proceed with transferring the film onto the substrate;

FIG. 7 is a view similar to that of FIG. 1 when the film has been transferred onto the substrate;

FIGS. 8 to 14 are views similar to those of FIGS. 1 to 7 and here illustrate a machine configured to transfer a preformed functional film onto a curved face of an ophthalmic substrate, according to a second embodiment of the invention;

FIGS. 16 to 22 are partial views of the machine illustrated in FIG. 15, in perspective or in section, in various configurations of the machine, in order to proceed with transferring the film onto the substrate;

DETAILED DESCRIPTION OF EXEMPLARY EMBODIMENTS

FIGS. 1 to 7 illustrate a machine 1 configured to transfer a preformed functional film 2 onto an ophthalmic substrate 3.

Figure 1:
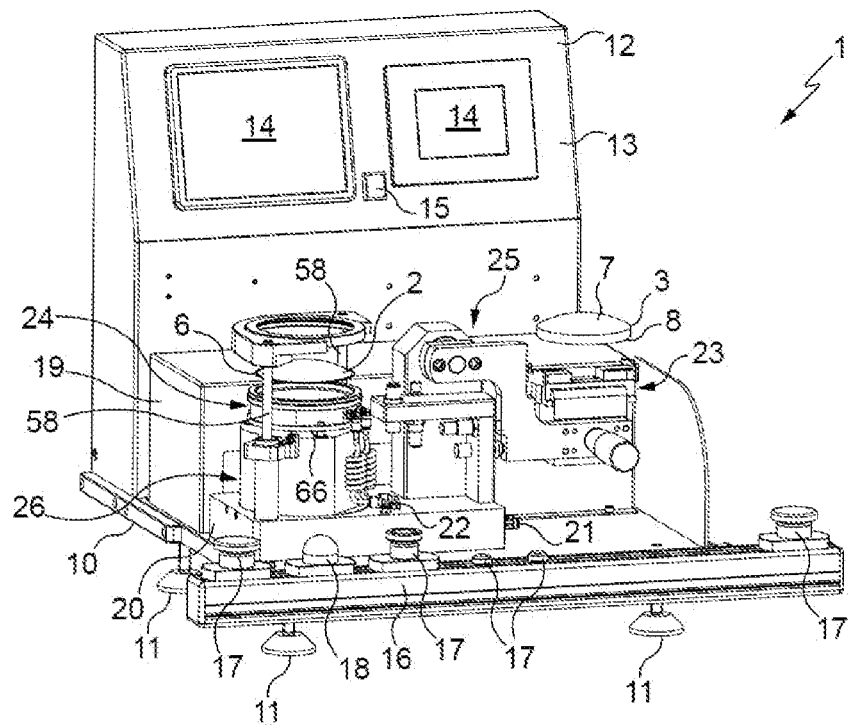
FIG. 1 is a perspective depiction of a machine configured to transfer a preformed functional film onto a curved face of an ophthalmic substrate, according to a first embodiment of the invention.
Figure 2:
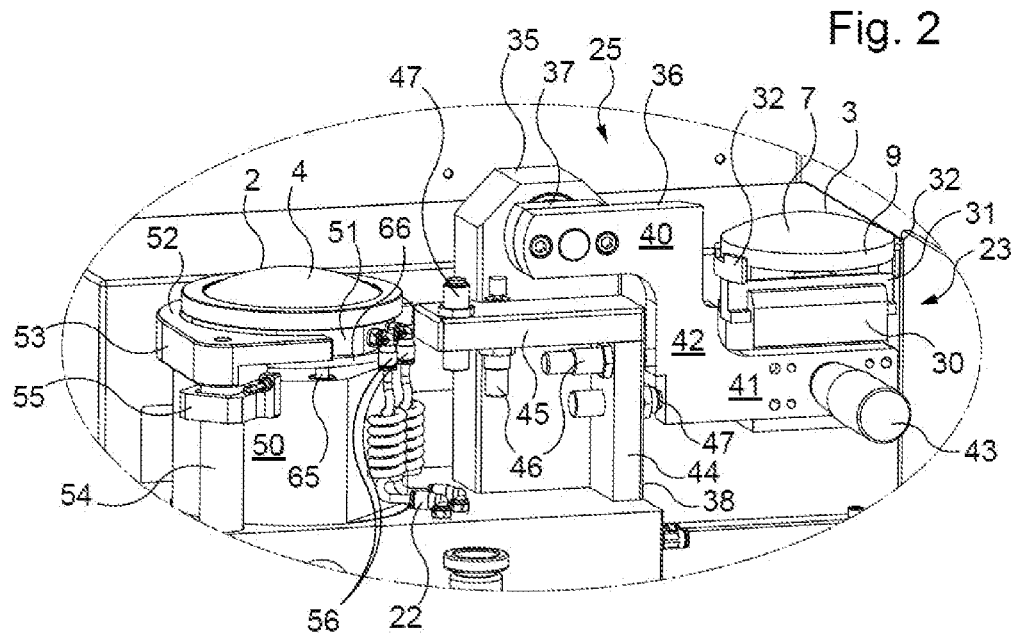
Figure 3:
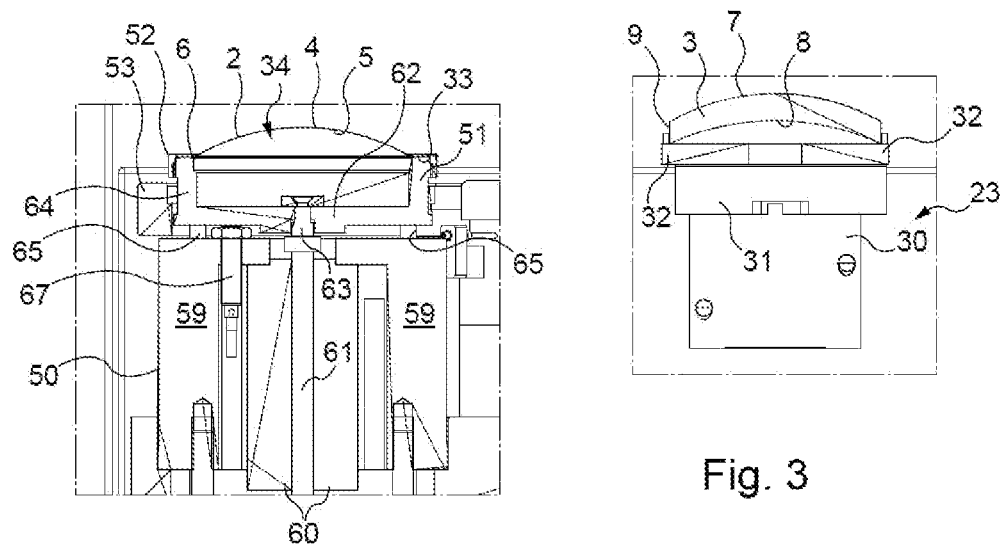

The preformed functional film 2 has a first face 4, a second face 5 the opposite face to its first face 4, and a circular perimeter 6 at its periphery (FIGS. 1 to 3).

The preformed functional film 2 may offer an impact-resistance function, an anti-scratch function, a reflection function such as an anti-reflective or mirror function, a polarizing function, a selective or otherwise filtering function, a photochromic function, an electrochromic function, an anti-static function, an anti-smudge function, and anti-fog function or even a water-repellent function, a bonding function or a combination of one or more of these functions.

The ophthalmic substrate 3 for its part has a curved first face 7, a second face 8 opposite to its curved first face 7, and a peripheral edge face 9 connecting its curved first face 7 and its second face 8 (FIGS. 1 to 3).

In this instance, the curved first face 7 of the substrate 3 is convex and its second face 8 is likewise curved and, more particularly, concave. This substrate 3 in this instance forms either a "semi-finished" product or a "finished" product as defined hereinabove. As an alternative, it may be a support for a plano lens.

The first face 4 of the film 2 is designed to be applied to the curved and convex first face 7 of the substrate 3. As an alternative, the curved first face of the substrate could be concave rather than convex.

The machine 1 here is compact and may for example be placed on a table or work surface. This machine 1 comprises a structure 10 mounted on adjustable feet 11.

The machine 1 comprises a command and control cabinet 12 mounted at the rear of the structure 10 and having a frontal face 13 in which graphic interfaces 14, formed for example of touch-screens, and a switch 15 for switching the machine 1 on and off, are housed.

The command and control cabinet 12 has an internal space housing a data processing system comprising for example a microprocessor and memories, and an electrical power supply system (none of which are illustrated).

The machine 1 comprises a command and control strip 16 mounted at the front of the structure 10 and forming, with the control cabinet 12, more generally a command and control unit of the machine 1. This command and control strip 16 here is provided with a plurality of control buttons 17 and a light indicator 18.

The machine 1 comprises a cover 19 mounted on the structure 10 between the cabinet 12 and the strip 16, and a soleplate 20 also mounted on the structure 10, between the cover 19 and the strip 16. The soleplate 20 is provided, on a lateral face, with first fluid inlet and outlet couplings 21 and, on a top face, with second fluid inlet and outlet couplings 22.

The machine 1 further comprises a first receiving device 23 configured to receive and hold the substrate 3 in a first predetermined position, a second receiving device 24, distinct from the first receiving device 23 and configured to hold the film 2 in a second predetermined position and located on a first side of the soleplate 20, a first movement mechanism 25, positioned on a second side of the soleplate 20, the opposite side to the first side, and configured to move the first receiving device 23, and a second movement mechanism 26 positioned on the first side of the soleplate 20 and configured to move the second receiving device 24.

The first receiving device 23, the second receiving device 24, the first movement mechanism 25 and the second movement mechanism 26 will now be described in greater detail with reference to FIGS. 2 and 3.

The first receiving device is formed in this instance by a gripper 23 provided with a body 30, with a rail 31 housed partially in a cutout formed in the body 30, and with two jaws 32 fixed firmly to the rail 31 and positioned facing one another at a predetermined distance apart. The rail 31 is not free to effect a translational movement in the cutout of the body 30. The distance between the jaws 32 can be adapted by means of the positioning of the jaws 32 on the rail 31.

The jaws 32 are configured to receive the substrate 3 in the first predetermined position and to hold it via its edge face 9 so that the substrate 3 can be automatically centered in the gripper 23.

The first movement mechanism 25 comprises a central bearing 35 fixed on the second side of the soleplate 20 and extending vertically from its upper face, a mobile arm 36 mechanically secured to the central bearing 35 by a pivot connection 37 situated at one end of the bearing 35, some distance away from the soleplate 20, and an angle-bracket component 38 mounted adjacent to the central bearing 35 on the soleplate 20.

The mobile arm 36 has a central portion 42 extending in a transverse direction, a securing portion 40 extending from a first end of the central portion 42 in a longitudinal direction and by means of which the mobile arm 36 is fixed to the bearing 35, and a support portion 41 extending from a second end of the central portion 42, opposite to its first end, in a longitudinal direction away from the securing portion 40.

The body 30 of the gripper 23 is fixed firmly to the supporting portion 41 of the mobile arm 36 and the latter is also provided with a manual actuation handle 43.

The angle-bracket component 38 has a horizontal first leg 45 arranged substantially in line with the securing portion 40, extending at least partially facing the latter, and which is provided with a free end that faces toward the second receiving device 24.

The angle-bracket component 38 also has a vertical second leg 44 which extends from the horizontal first leg 45 and rests on the soleplate 20.

The angle-bracket component 38 is provided, on each of its first and second legs 45 and 44, with a stop member 46, for example adjustable and shock-absorbing, and with a position detector 47.

The stop member 46 and the position detector 47 which is situated on the horizontal first leg 45 are configured to collaborate with a face of the securing portion 40 of the mobile arm 36; whereas the stop member 46 and the position detector 47 which are situated on the vertical second leg 44 are configured to collaborate with a face of the central portion 42 of the mobile arm 36, for example at its second end from which the supporting portion 41 extends.

The second receiving device 24 and the second movement mechanism 26 here are arranged in the one same assembly comprising a body 50 fixed to the soleplate 20, a head 51 able to move with respect to the body 50 and forming a horizontal base for receiving the film 2, also referred to as bowl, an annular ring 52 designed to partially cover the head 51 so as to hold the film 2 in position, a collar 53 at least temporarily supporting the ring 52, and actuators 54, fixed to the body 50 by means of flanges 55 and configured for moving the collar 53.

This arrangement allows the film 2 to be centered automatically or, at the very least very accurately, on the head 51.

The head 51 has a side wall 64 in which orifices (not illustrated) that open into an internal space of the head 51 and that communicate with third fluid inlet and outlet couplings 56 are formed, which couplings are coupled by pipes 57 to the second fluid inlet and outlet couplings 22.

Each actuator 54 is provided with a mobile rod 58 securely fixed to the collar 53.

The collar 53 here has a semicircular shape and is provided with a seat to bear the ring 52.

The body 50 comprises a fixed part 59 mechanically secured to the soleplate 20, a central actuator 60 mounted in the fixed part 59 and provided with a rod 61 that is mobile with respect to the body 50 and which is fixed securely by one end 63 to an end wall 62 of the head 51 in order to drive the latter in a vertical translational movement.

The assembly further comprises guide pins 65 mounted partially in the fixed part 59 of the body 50 and able to move relative to the latter, with these guide pins 65 being firmly secured to the head 51 at a circular flange 66 formed as a projection out from the side wall 64 thereof; as well as a stop member 67, for example here of the mechanical type involving a feeler, mounted partially in the fixed part 59 of the body 50 and able to move with respect to the latter, with this mechanical stop 67 being securely fixed under the end wall 62 of the head 51.

It will be noted that when the film 2 is received in the head 51 in its second predetermined position and held in position by the ring 52, a first closed chamber 34 is thus formed, which can be likened to a sealed chamber.

The operation of the machine 1 described hereinabove and visible in FIGS. 1 to 7 in five different configurations will now be described.

In FIG. 1, the machine 1 is in a rest configuration in which the film 2 and the substrate 3 are not respectively mounted on the head 51 and on the gripper 23.

In this rest configuration, the mobile arm 36 is in a first position in which the support portion 41 and, therefore, the gripper 23, are cantilevered in relation to the soleplate 20.

The gripper 23 is thus readily accessible and mounting the substrate 3 in its first predetermined position between the jaws 32 of the gripper 23 can be performed simply, conveniently and accurately.

In this rest configuration, the mobile rods 58 of the actuators 54 are in an extended position. The collar 53 and the ring 52 that it bears are therefore in a raised position, leaving space for the placement of the preformed film 2, in its second predetermined position, on the head 51.

In FIGS. 2 and 3, the machine 1 is in a clamping configuration in which the film 2 and the substrate 3 are respectively mounted and held on the head 51 and on the gripper 23, in their respective predetermined position.

The substrate 3 is thus in its first predetermined position clamped by the jaws 32 of the gripper 23.

The perimeter 6 of the film 2 is arranged on an upper edge 33 of the head 51.

The mobile rods 58 of the actuators 54 are in a retracted position, thus bringing the collar 53 into a lowered position.

The ring 52 for its part is in an intermediate position somewhere between its raised position and the lowered position of the collar 53, in which intermediate position it rests on the upper edge 33 of the head 51, partially covers the side wall 64 thereof and clamps the perimeter 6 of the film 2, under a predetermined pressure force applied to this perimeter 6, with this force substantially evenly distributed around this perimeter.

In the clamping configuration, the curved face 7 of the substrate 3 and the first face 4 of the film 2 which is the face intended to be applied to this curved face 7 are each facing in the one same axial direction.

The machine 1 is configured so that the center of the circle passing through the geometric centers of the film and of the substrate lies along the axis of the pivot connection 37 which connection here is positioned equal distances from each of these geometric centers.

In the clamping configuration, the command and control unit is configured to generate, notably via the couplings 21, 22 and 26 and pipes 57, a positive pressure difference within the first sealed and closed chamber 34 in relation to its immediate surroundings (in this instance the ambient air) so as to place the preformed functional film 2 under tension.

The positive pressure difference within the first chamber 34 in relation to its immediate surroundings is, for example, comprised between 0.1 and 1 bar, preferably comprised between 0.1 and 0.5 bar, and more preferably still, equal to around 0.25 bar.

The increase in pressure thus generated in the first chamber 34 and the resulting tensioning of the film 2 thus allow an identical pressure to be applied to the entire surface of the film 2 thus evening out the distribution of stress across this surface.

This increase in pressure may be considered as being a pressurizing of the first chamber 34, at least in relation to the outside, or as the creation of a reduced pressure in the immediate surroundings of the first chamber 34, in comparison with this chamber. This increase in pressure may also be considered as being an at least relative pressurizing in relation to the first face 4 the film 2, which faces toward the outside of the first chamber 34.

Figure 4:
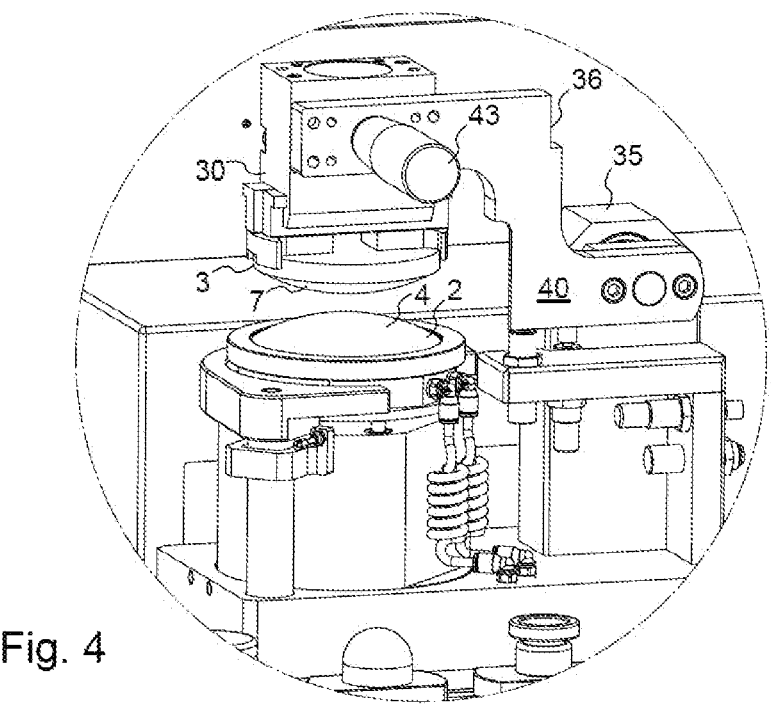

In FIG. 4, the machine 1 is in an inverting configuration in which the curved face 7 of the substrate 3 is brought to face the first face 4 of the film 2, at some distance from one another, and with the respective geometric centers of the substrate 3 and of the preformed functional film 2 aligned (line in dotted lines in FIG. 4).

In order to achieve this, the mobile arm 36 is actuated, automatically by the command and control unit or manually using the handle 43 to make it rotate about the central bearing 35 until the securing portion 40 comes into contact and into abutment with the stop member 46 and position detector 47 situated on the horizontal first leg 45 of the angle-bracket component 38. The mobile arm 36 thus moves from a first position (FIG. 2) into a second position (FIG. 4).

In FIGS. 5 and 6, the machine 1 is in a laminating configuration in which the center of the first face 4 of the film 2 and the center of the curved face 7 of the substrate 3 are brought into contact.

This contact allows the functional film 2 to be applied to the ophthalmic substrate 3 by reversing the curvature of the functional film 2 so as to spread, radially from the center of the functional film 2 as far as the periphery thereof (the region of its perimeter 6), conformal contact between the functional film 2 and the curved face 7 of the substrate 3.

In order to achieve this, the command and control unit here is configured to act on the central actuator 60 so as to bring the mobile rod 61 into an extended position and thus move the head 51 in a vertical translational movement toward the gripper 23 and toward the substrate 3.

The extension of the mobile rod 61 is accompanied by the deployment of an essentially U-shaped wedging member 69 which extends into the internal space of the U.

The command and control unit is configured to move the head 51 in a controlled manner, for example at a constant predetermined closing speed between the head 51 and the gripper 23, notably a closing speed of the order for example of 0.05 to 20 millimeters/second, preferably of the order of 0.3 to 0.5 millimeters/second.

It will be noted in particular that the command and control unit is configured to move the head 51 at the speed indicated hereinabove, at least when the film 2 and the substrate 3 are distant from one another by just a few centimeters and/or when they are already in contact.

The application of the film 2 to the substrate 3 and the inversion of the curvature of the film 2 intrinsically generates a pressure in the first chamber 34, which pressure is controlled and regulated to a value such as those mentioned above, for example 0.25 bar.

It will be noted that, at the end of the lamination step (at the end of the inversion of the curvature of the film) the pressure can be controlled and regulated in such a way as to be comprised for example between 0 and 5 bar, preferably comprised between 1.5 and 3.5 bar, for a duration for example comprised between 30 seconds and 10 minutes.

Such a step in which the pressure is controlled in the first chamber 34 may notably allow the film 2 to be kept pressed firmly against the substrate 3 after lamination thus beginning the intrinsic process of bonding between these elements, particularly in instances in which the substrate 3 is at least partially coated with a layer of a pressure-sensitive adhesive.

During lamination, the mobile arm 36 is kept in its second position, for example by means of a wedge 49 here interposed between the securing portion 40 of the mobile arm 36 and the horizontal first leg 45 of the angle-bracket component 38.

In FIG. 7, the machine 1 is once again in its rest configuration and the assembly made up of the preformed functional film and of the substrate 3 forms an ophthalmic lens 68.

In order to achieve this, the ring 52 has been removed from the head 51, the arm 36 has been actuated to make it return with the laminated assembly to its first position in which the central portion 42 comes into contact and abutment with the stop member 46 and position detector 47, which members are situated on the vertical second leg 44 of the angle-bracket component 38, and the ophthalmic lens 68 thus formed has been removed from the jaws 32 of the gripper 23.

As an alternative, at the end of lamination, the jaws 32 are opened, the arm 36 is actuated to return without the laminated assembly to its first position, and then the ring 52 is removed from the head 51 in order to release the ophthalmic lens 68 thus formed.

FIGS. 8 to 14 illustrate a machine 100 configured to transfer a preformed functional film 102 onto an ophthalmic substrate 103.

The preformed functional film 102 and the ophthalmic substrate 103 here are similar to the preformed functional film 2 and to the ophthalmic substrate 3 which were described with reference to FIGS. 1 to 7.

The machine 100 comprises a lift system 170 provided with a base 171 and with a chassis having a fixed part 172 mounted on a mounting plate 173 of the machine 100 and a mobile part 174 that is able to move with respect to the fixed part 172.

The machine 100 comprises several command and control sub-units 115 more globally forming a command and control unit of the machine 100, having a data processing system comprising for example a microprocessor and memories, as well as an electrical power supply system (none of which are illustrated).

The machine 100 comprises a mobile plate 175 which is mounted with the ability to rotate on the mobile part 174 of the lift system 170 via a drive member 178 and to which is securely attached a first support plate 176 extending from the mobile plate 175 toward a first side of the machine 100; and a second support plate 177 securely attached to the support plate 173 and/or to the fixed part 172 of the lift system, on a second side of the machine 100 which is the opposite side to the first side.

The machine 100 further comprises a first receiving device 123 positioned on the first support plate 176, on the first side of the machine 100, and configured to receive and hold the substrate 103 in a first predetermined position; as well as a second receiving device 124, distinct from the first receiving device 123, positioned on the second support plate 177 on the second side of the machine 100 and configured to hold the film 102 in a second predetermined position.

The drive member 178 and the mobile plate 175 here form a first movement mechanism 125, and the lift system 170 here forms a second movement mechanism; with these first and second mechanisms each being configured to move the first receiving device 123.

The machine 100 comprises a locking actuator 180 mounted at a free end of the mobile part 174 of the lift system 170 which is the opposite end to the base 171.

Figure 11:
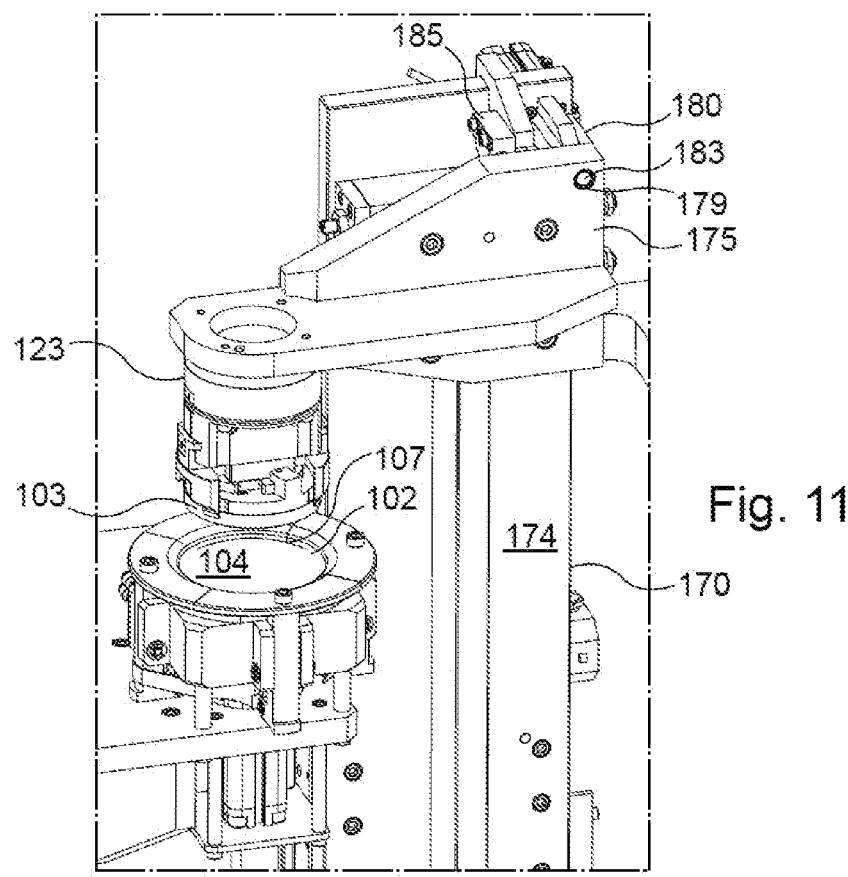

This locking actuator 180 has a body 181 and a head 182 from which there projects a locking finger 183 configured to fit into an orifice 179 formed in the mobile plate 175 when the latter has moved from a first position (FIG. 8) into a second position (FIG. 11).

The machine 100 further comprises a first position detector 185 mounted on a first flange 184 fixed to the mobile part 174 at its free end and in this instance in close proximity to the head 182 of the locking actuator 180.

The machine 100 further comprises a second position detector 186 mounted on a second flange 187 itself mounted on an angle bracket 188 fixed to the mobile part 174 of the lift system 170; as well as a stop member 189 positioned on the angle bracket 188.

The angle bracket 188 is positioned on the mobile part 174 so that when the mobile plate 175 is in its first position, the first support plate 176 comes into contact and abutment with the second position detector 186 and with the stop member 189.

The first receiving device 123 and second receiving device 124 will now be described in more detail with reference to FIGS. 8 to 10.

The first receiving device is formed in this instance by a gripper 123 provided with a body 130, with two rails 131 housed partially in a cutout formed in the body 130, and with two jaws 132 each fixed firmly to one of the rails 131 and positioned facing one another at a predetermined distance apart. The rails 131 are not free to effect a translational movement in the cutout of the body 130. The distance between the jaws 132 can be adapted by means of the positioning of the jaws 132 on the rails 131.

The body 130 is firmly fixed to one end of the first support plate 176 and may have orifices communicating with fluid inlet and outlet couplings (not depicted).

The gripper 123 further comprises a centering member 190 mounted on the rails 131, between the two jaws 132, and a counterform 191 forming a support for the substrate 103, which counterform is placed on the centering member 190 and clamped between the two jaws 132.

The jaws 132 are also configured to receive the substrate 103 in the first predetermined position and to hold it via its edge face 109 so that the substrate 103 can be automatically centered in the gripper 123.

The counterform 191 has a curved external face 192 which conforms to the second face 108 of the substrate 103.

The second receiving device 124 comprises a bell housing 193 mounted on an upper face of the second support plate 177 and roughly forming a bowl to receive the film 102, a disk 194 mounted on an upper edge of the bell housing 193, a first seal (not depicted) interposed and clamped between the disks 194 and this upper edge, and a second seal 195 mounted on a shoulder of the disk 194.

The bell housing 193 has a wall in which orifices (not illustrated) that open into an internal space of the bell housing 193 and that communicate with fluid inlet and outlet couplings (not illustrated) are formed.

The second receiving device 124 further comprises a clamping mechanism 196 formed by a plurality of articulated arms 197 (in this instance four) each having an end gripper 198 and which are positioned on the upper face of the second support plate 177; and by a central actuator 199 are arranged roughly on the side of a lower face of the second support plate 177, the opposite side to its upper face, and acting on the articulated arms 197 via a hole formed in the second support plate 177.

Each articulated arm 197 is provided at a first end with an adjustment member 139, in this instance a screw—spring system inserted into a well formed in the articulated arm 197, and is configured to adjust the position of the end gripper 198 with respect to the arm 197 and thus clamp the perimeter 106 of the film 102 between this gripper 198 and the second seal 195 mounted on the shoulder of the disk 194.

This arrangement allows the film 102 to be centered on the bowl 193 automatically or, at the very least, very precisely.

Each articulated arm 197 is further provided at a second end opposite to the first end, with a tilting device 206 involving roller and elastic return means.

The central actuator 199 comprises a body 209 and a rod 201 that is mobile relative to the body 209. This rod 201 is provided at a free end 202 with an end piece 203 exhibiting actuating tabs 204 (in this instance four) each of which is provided with a leading edge 205 configured to collaborate with the tilting device 206 and, in particular, the roller, of each respective articulated arm 197.

It will be noted that when the film 102 is received in the bell housing 193 in its second predetermined position and held in position by the disk 194 and the articulated arms 197, a first closed chamber 134 is thus formed, which can be likened to a sealed chamber.

The operation of the machine 100 described hereinabove and visible in FIGS. 8 to 14 in five different configurations, similar to the configurations of the machine 1 described hereinabove, will now be described.

In FIG. 8, the machine 100 is in a rest configuration in which the gripper 123 is not gripping the substrate 103 (not visible in this figure) and the articulated arms 197 are in a parted position and the film 102 (not visible in this figure) is not mounted in the bell housing 193.

In this rest configuration, the mobile plate 175 is in its first position in which the first support plate 176 and, therefore, the gripper 123, are on the first side of the machine 100.

The gripper 123 is thus readily accessible and mounting the substrate 103 in its first predetermined position between the jaws 132 of the gripper 123 can be performed simply, conveniently and accurately.

In this rest configuration, the rod 201 of the central actuator 199 is in an extended position (not visible) and the leading edges 205 of the tabs 204 of the end piece 203 of the rod 201 are not acting upon the tilting devices 206 of the articulated arms 197 against the action of the elastic return members which therefore urge the arms 197 into a parted position.

Figure 9:
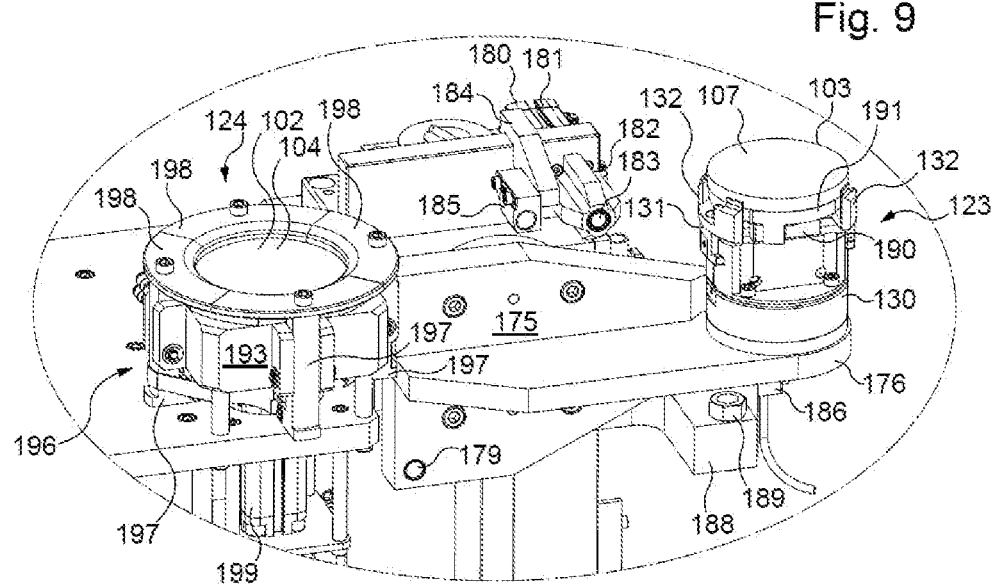
Figure 10:
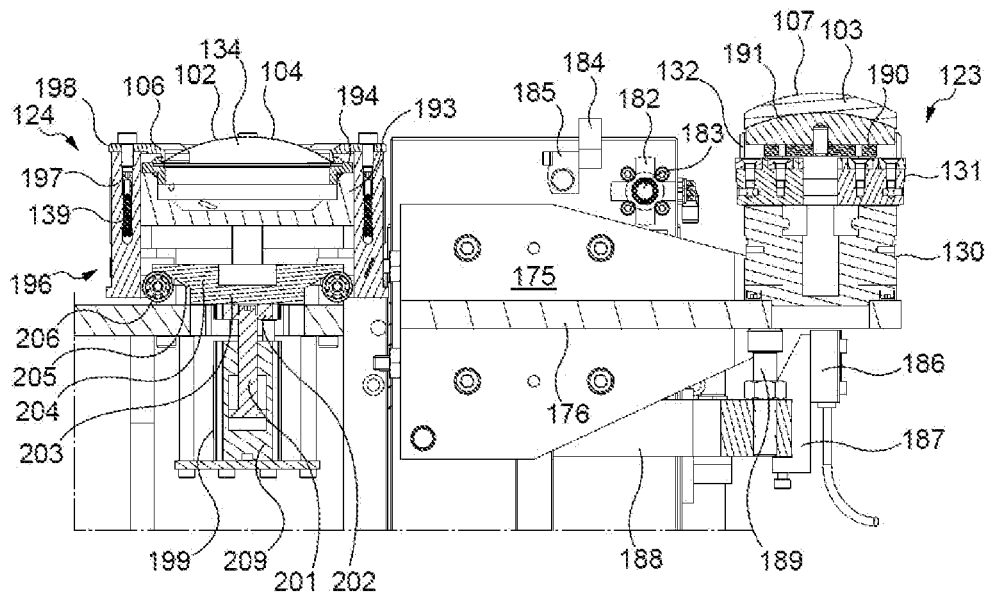

In FIGS. 9 and 10, the machine 100 is in a clamping configuration in which the film 102 and the substrate 103 are respectively mounted and held on the bell housing 193 and on the gripper 123, in their respective predetermined position.

The substrate 103 is thus mounted on the counterform 191, in its first predetermined position, and is clamped by the jaws 132 of the gripper 123.

The perimeter 106 of the film 102 is placed on the seal 195 mounted in the shoulder formed on the disk 194 of the bell housing 193.

In this clamping configuration, the rod 201 of the central actuator 199 is in a retracted position and the leading edges 205 of the tabs 204 of the end piece 203 of the rod 201 urge the tilting devices 206 of the articulated arms 197 against the action of the elastic return members and move the arms 197 into a close-up-together position in which the end grippers 198 are in line with the perimeter 106 of the film 102.

What is more, the end grippers 198 are urged towards the film 102 by the action of the adjustment members 139 to vertically clamp this film 102 between the end grippers 198 and the seal 195 of the disk 194.

In the clamping configuration, the curved face 107 of the substrate 103 and the first face 104 of the film 102 which is the face intended to be applied to this curved face 107 are each facing in the one same axial direction.

The machine 100 is configured so that the center of the circle passing through the geometric centers of the film and of the substrate passes through the center of rotation of the mobile plate 175 in the region of the drive member 178, which center of rotation here is positioned equal distances from each of these geometric centers.

In the clamping configuration, the command and control unit is configured to generate, notably via the fluid inlet and outlet couplings and pipes (not illustrated), a positive pressure difference within the first sealed and closed chamber 134 in relation to its immediate surroundings (in this instance the ambient air) so as to place the preformed functional film 102 under tension in the way described above with reference to FIGS. 1 to 7.

In FIG. 11, the machine 100 is in an inverting configuration in which the curved face 107 of the substrate 103 is brought to face the first face 104 of the film 102, at some distance from one another, and with the respective geometric centers of the substrate 103 and of the preformed functional film 102 aligned (line in dotted lines in FIG. 11).

In order to do this, the mobile plate 175 is actuated, automatically via the command and control unit, so as to be turned with respect to the mobile part 174 of the lift system 170 until the mobile plate 175 has moved from its first position (FIG. 9) into a second position (FIG. 11).

The second position of the mobile plate 175 may be detected by the position detector 185, and the finger 183 of the locking actuator 180 may enter the orifice 179 in the mobile plate, thus immobilizing the mobile plate 175 in its second position.

Figure 12:
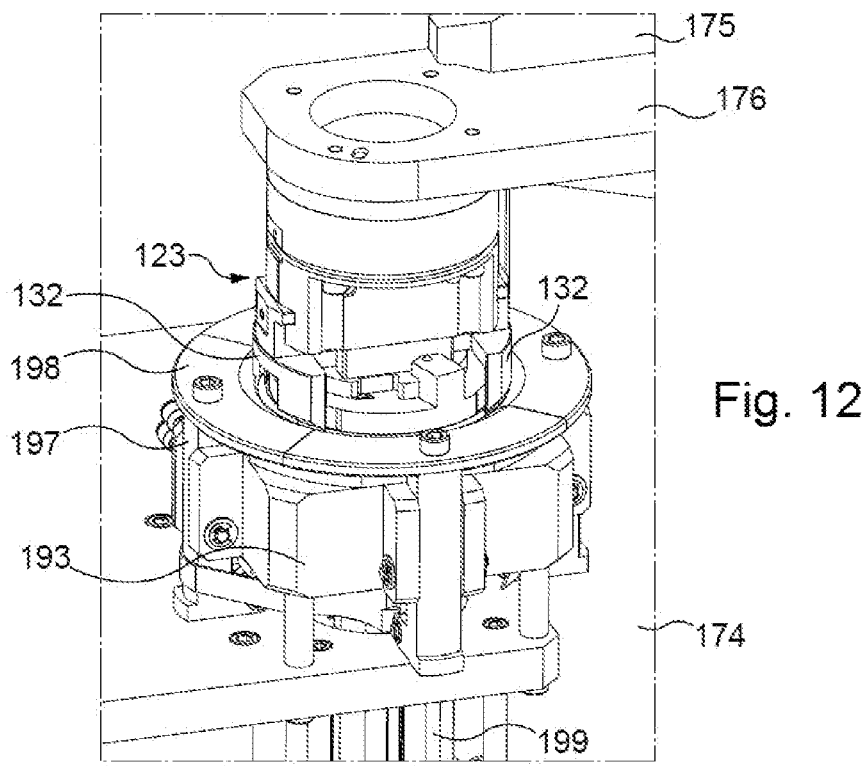
Figure 13:
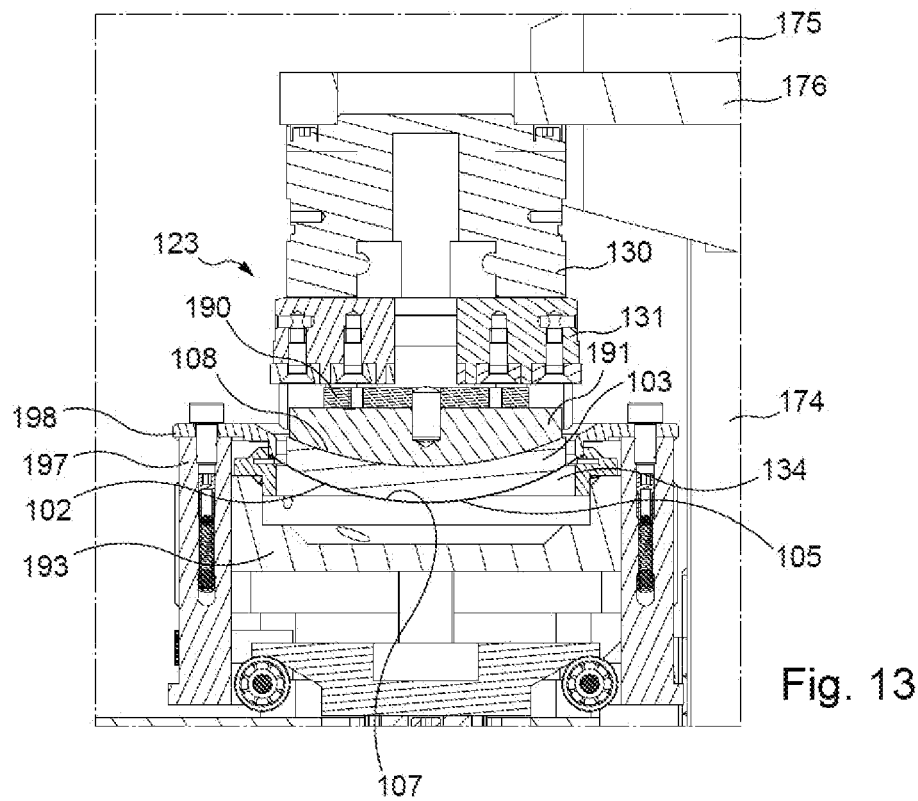

In FIGS. 12 and 13, the machine 100 is in a laminating configuration in which the center of the first face 104 of the film 102 and the center of the curved face 107 of the substrate 103 are brought into contact.

This contact allows the functional film 102 to be applied to the ophthalmic substrate 103 by reversing the curvature of the functional film 102 so as to spread, radially from the center of the functional film 102 as far as the periphery thereof (the region of its perimeter 106), conformal contact between the functional film 102 and the curved face 107 of the substrate 103.

In order to do this, the command and control unit is configured to act on the lift system 170 to move its mobile part 174 and, therefore, the first support plate 176, on the mobile plate 175, with respect to its fixed part 173 and, therefore, with respect to the second support plate 177; so as to move the gripper 123, and therefore the substrate 103, in a vertical translational movement toward the bell housing 193 and, therefore, toward the film 102.

The free ends of the jaws 132 of the gripper 123 become at least partially housed substantially against the end grippers 198 of the articulated arms 197.

The command and control unit is configured to move the mobile part 174 of the lift system 170 in a controlled manner, for example at a constant predetermined closing speed between the bell housing 193 and the gripper 123, notably a closing speed of the order for example of 0.05 to 20 millimeters/second, preferably of the order of 0.3 to 0.5 millimeters/second.

The application of the film 102 to the substrate 103 and the inversion of the curvature of the film 102 intrinsically generates a pressure in the first chamber 134, which pressure is controlled and regulated to, for example, 0.25 bar in the same way as was indicated above; and, furthermore, at the end of the lamination step (at the end of the inversion of the curvature of the film) the pressure can be controlled and regulated in such a way as to be comprised for example between 0 and 5 bar, preferably comprised between 1.5 and 3.5 bar, for a duration for example comprised between 30 seconds and 10 minutes.

Figure 14:
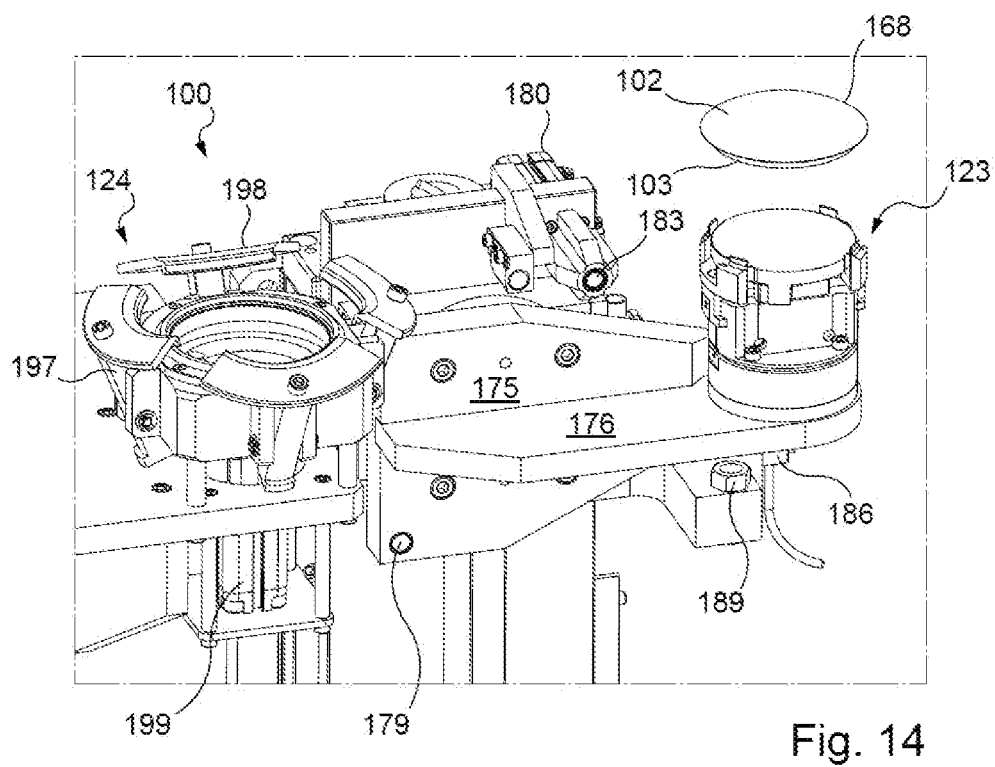

In FIG. 14, the machine 100 is once again in its rest configuration and the assembly made up of the preformed functional film 102 and of the substrate 103 forms an ophthalmic lens 168.

For this, the rod 201 of the central actuator 199 has returned to an extended position (not visible) and the leading edges 205 of the tabs 204 of the end piece 203 of the rod 201 are not acting upon the tilting devices 206 of the articulated arms 197 against the action of the elastic return members which therefore urge the arms 197 and the grippers 198 into a parted position.

What is more, the finger 183 of the locking actuator 180 has been removed from the orifice 179 in the mobile plate 175 and the latter has been actuated to make it return with the laminated assembly to its first position in which the first support plate 176 comes into contact and abutment with the second position detector 186, and with the stop member 189; and the ophthalmic lens 168 thus formed has been removed from the jaws 132 of the gripper 123.

FIGS. 15 to 23 depict an alternative form of embodiment of the machine 100 illustrated in FIGS. 8 to 14. The same references will therefore be re-used for similar elements, but with the addition of the FIG. 100.

The machine 200 comprises a lift system 270, a mobile plate 275, first and second support plates 276 and 277, a locking actuator 280 and position detectors 285 and 286 similar to those of the machine 100.

The machine 200 also comprises several command and control sub-units more globally forming a command and control unit, having a data processing system comprising for example a microprocessor and memories, as well as an electrical power supply system (none of which are illustrated).

The machine 200 further comprises a first receiving device 223 positioned on the first support plate 276, on the first side of the machine 200, and configured to receive and hold the substrate 203 in a first predetermined position; as well as a second receiving device 224, distinct from the first receiving device 223, positioned on the second support plate 277 on the second side of the machine 200 and configured to hold the film 202 in a second predetermined position.

The drive member 278 and the mobile plate 275 here form a first movement mechanism 225, and the lift system 270 here forms a second movement mechanism; with these first and second mechanisms each being configured to move the first receiving device 223.

The machine 200 further comprises pressure sensors 345 mounted on the mobile part 274 and/or the mobile plate 275.

The first receiving device 223 and second receiving device 224 which differ appreciably from the first and second receiving devices 123 and 124 of the machine 100 will now be described in greater detail.

The first receiving device 223 comprises a cylindrical shell 332 surmounted by an annular sealing ring 333 and extending from an upper face of the first support plate 276.

The first receiving device 223 is fixed to the first support plate 276 by means of a nut 331 mechanically secured to a lower face of this first support plate 276.

The first receiving device 223 comprises a centring collar 334 partially and laterally surrounded by the annular sealing ring 333; which collar 334 is here provided with a plurality of slots and orifices 355 forming substantially elastic tongues 356 and is configured to receive and clamp the substrate 203 so that the latter can be automatically centered.

The first receiving device 223 comprises a mobile piston 335, positioned inside the cylindrical shell 332, provided at each end with at least one sealing means 336, and which is configured to collaborate with the annular sealing ring 333.

The first receiving device 223 further comprises a fixed hydraulic cylinder 337, encased laterally by the mobile piston 335 and which extends through an orifice formed in the first support plate 276.

The hydraulic cylinder 337 is provided with two fluid-carrying ducts 338 which extend along the cylinder 337, between the fluid inlet and outlet couplings 339 which are situated in the region of the nut 331 and coupled to external pipes 342. The hydraulic cylinder 337 is thus provided with orifices (not depicted) that open at the opposite end of these pipes 338 to the couplings 339.

The first receiving device 223 further comprises a counterform 291 forming a support for the substrate 203 and fixed securely to the hydraulic cylinder 337 and at least partially clamped in the collar 334.

The counterform 291 is provided with a circular groove 360 in which a sealing member 340 is housed and with several holes 341 which open on each side of the thickness of the counterform 291 and communicate with the orifices of the conveying ducts 338 of the hydraulic cylinder 337.

It will be noted that the holes 341 in the counterform 291, the ducts 338, the fluid inlet and outlet couplings 339 and the pipes 341 are used to pull a vacuum under the substrate 203 so as to hold it in position by suction.

The counterform 291 has a curved external face 292 which conforms to the second face 208 of the substrate 203.

The second receiving device 224 comprises a cylindrical component referred to here as a bowl 350, mounted on a plate 351 which is firmly secured to the second support plate 277, an annular collar 352 which partially covers the bowl 350 and is firmly attached thereto, a first seal 361 housed in a shoulder formed in this collar 352 and intended to receive the film 202, a washer 353 mounted on an upper edge of the collar 300 and firmly attached thereto, and a second seal 354 interposed between the upper edge of the collar 352 and the washer 353.

This arrangement and, in particular, the collar 352, the shoulder thereof and the first seal 361 define a housing for the film 202 which is thus automatically centered or at the very least positioned very accurately on the bowl 350.

Orifices (not depicted) may be formed in one wall of the bowl 350 and open into an internal space thereof. If appropriate, these orifices may communicate with fluid inlet and outlet couplings (which are not illustrated).

It will be noted that when the film 202 is received in the bowl 350 in its second predetermined position and held in position, a first closed chamber 234 is thus formed, which can be likened to a sealed chamber.

The operation of the machine 200 described hereinabove and visible in FIGS. 15 to 23 in different configurations, fairly similar to the configurations of the machine 100 described hereinabove, will now be described.

Figure 15:
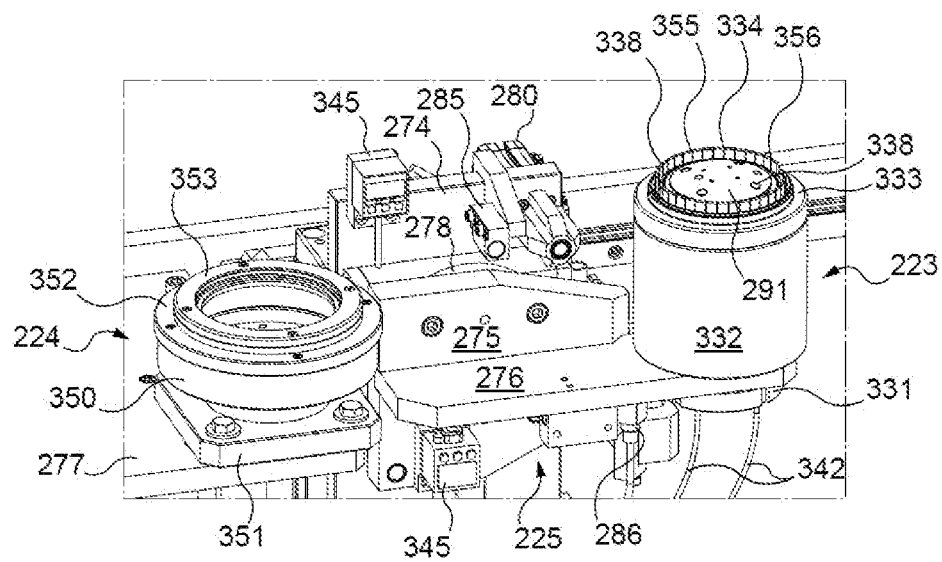
FIG. 15 is a partial perspective view of an alternative form of embodiment of the machine illustrated in FIG. 8.

In FIG. 15, the machine 200 is in a rest configuration in which the device 223 is not gripping the substrate 203 (not visible in this figure) and the film 202 (not visible in this figure) is not mounted in the bowl 350.

In this rest configuration, the mobile plate 275 is in its first position in which the first support plate 276 and, therefore, the device 223, are on the first side of the machine 200.

The device 223 is thus readily accessible and mounting the substrate 203 in its first predetermined position clamped between the tongues 356 of the collar 334 can be performed simply, conveniently and accurately.

Figure 16:
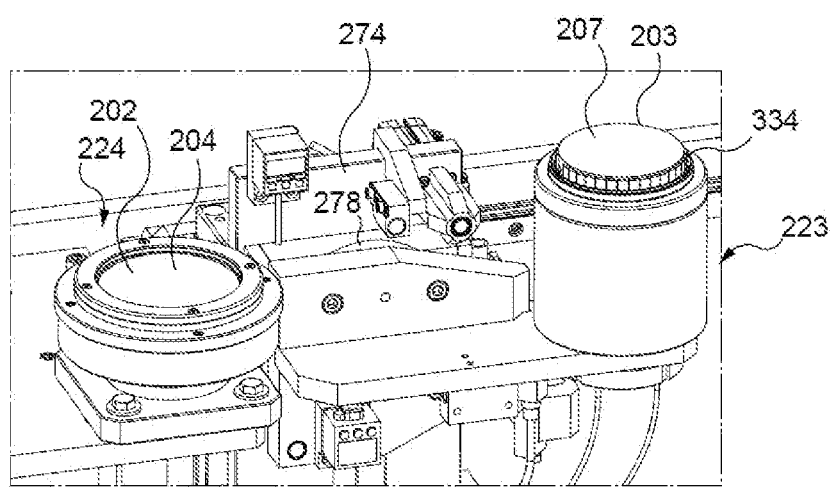

In FIGS. 16 and 17, the machine 200 is in a clamping configuration in which the film 202 and the substrate 203 are respectively mounted and held on the bowl 350 and in the collar 334, in their respective predetermined position.

The substrate 203 is thus mounted on the counterform 291, in its first predetermined position, and is clamped in the collar 334 of the device 223.

The perimeter 206 of the film 202 is placed on the first seal 361 mounted in the shoulder formed in the collar 352.

In the clamping configuration, the curved face 207 of the substrate 203 and the first face 204 of the film 202 which is the face intended to be applied to this curved face 207 are each facing in the one same axial direction.

The machine 200 is configured so that the center of the circle passing through the geometric centers of the film and of the substrate passes through the center of rotation of the mobile plate 275 in the region of the drive member, which center of rotation here is positioned equal distances from each of these geometric centers.

In FIG. 18, the machine 200 is in an inverting configuration in which the curved face 207 of the substrate 203 is brought to face the first face 204 of the film 202, at some distance from one another, and with the respective geometric centers of the substrate 203 and of the preformed functional film 202 aligned.

In order to do this, the mobile plate 275 is actuated, automatically via the command and control unit, so as to be turned with respect to the mobile part 274 of the lift system 270 until the mobile plate 275 has moved from its first position (FIG. 16) into a second position (FIG. 18).

The second position of the mobile plate 275 may be detected by the position detector 285, and the finger 283 of the locking actuator 280 may enter the orifice 279 in the mobile plate, thus immobilizing the mobile plate 275 in its second position.

In the inverting configuration, the mobile piston 335 is in a retracted position inside the cylindrical shell 332 of the device 223.

Figure 19:
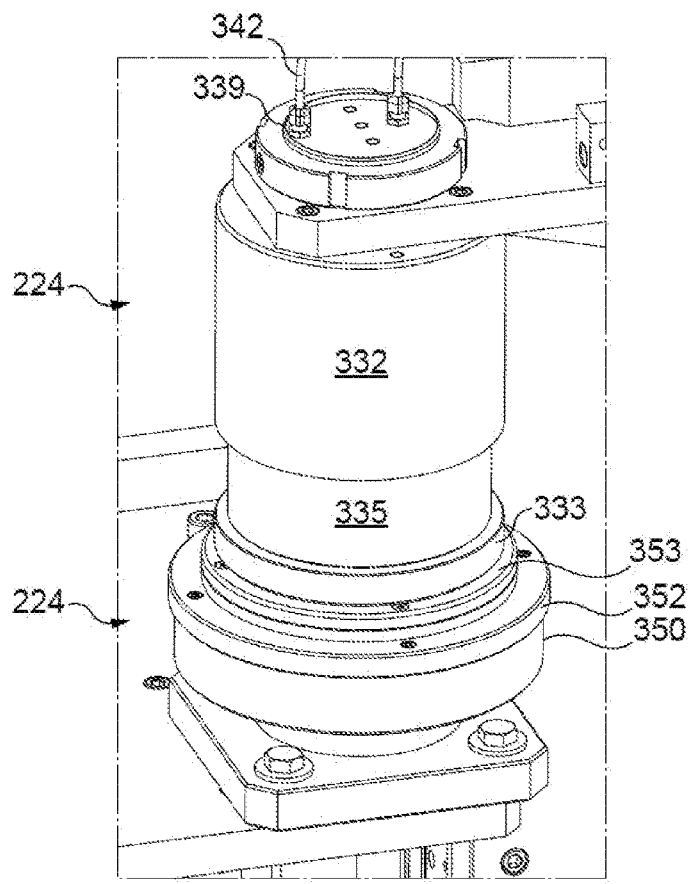
Figure 20:
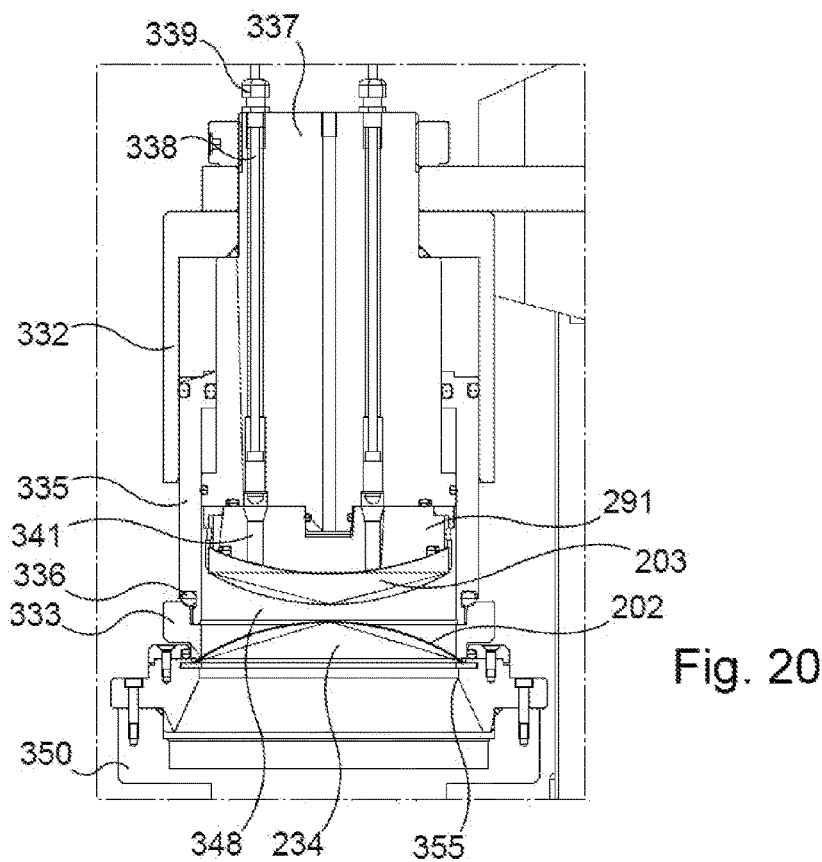

In FIGS. 19 and 20, the machine 200 is in a pre-lamination configuration in which the mobile piston 335 is made to move from its retracted position into an extended position, taking with it the annular sealing ring 333 until the latter is brought into contact, via an end edge 355, with the perimeter 206 of the film 202 and substantially in contact with the second seal 354 on the washer 353 of the device 224.

A second closed chamber 348 is thus formed, which can be likened to a sealed chamber, and is delimited notably by the curved face 207 of the substrate 203 and the first face 204 of the film 202.

In the pre-lamination configuration, the command and control unit may be configured to generate, notably via the fluid inlet and outlet couplings and pipes (not illustrated), a positive pressure difference within the first closed chamber 234 in relation to its immediate surroundings (in this instance the ambient air) so as to place the preformed functional film 202 under tension in the way described above.

In the pre-lamination configuration, the command and control unit is also configured to generate, for example by suction and notably via slots and orifices 355 in the collar 334, a negative pressure difference within the second sealed and closed chamber 348 in relation to the first chamber 234, via a suction system (not illustrated).

Figure 21:
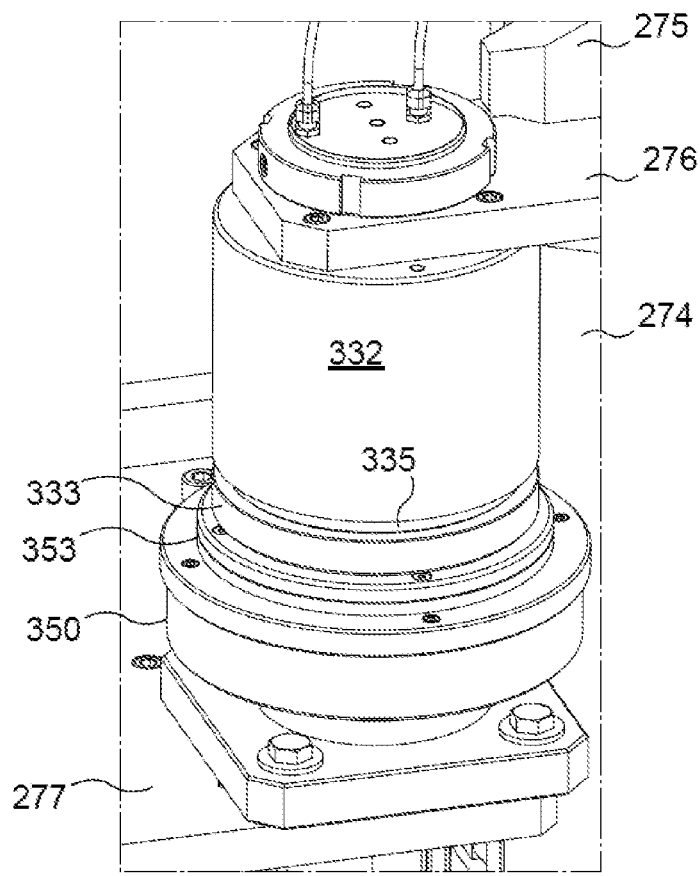
Figure 22:
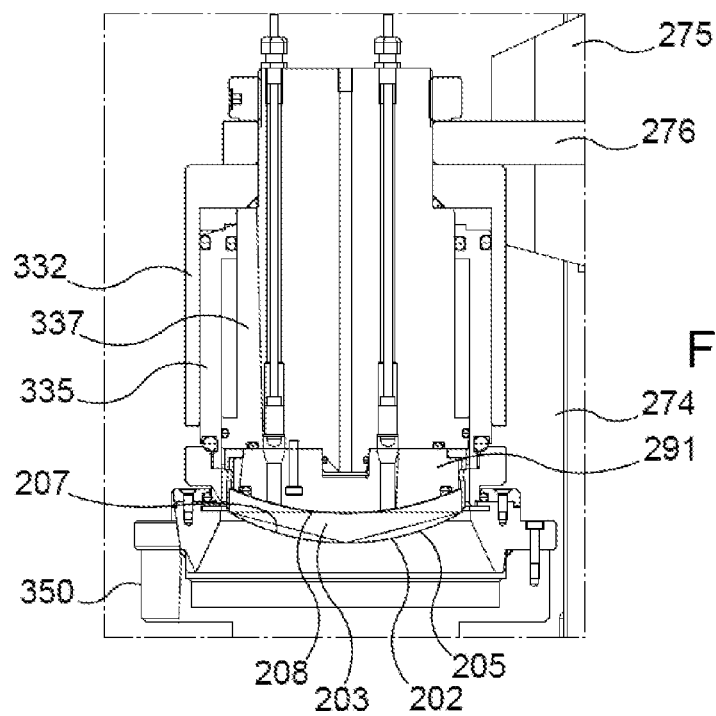

In FIGS. 21 and 22, the machine 200 is in a laminating configuration in which the center of the first face 204 of the film 202 and the center of the curved face 207 of the substrate 203 are brought into contact.

This contact allows the functional film 202 to be applied to the ophthalmic substrate 203 by reversing the curvature of the functional film 202 so as to spread, radially from the center of the functional film 202 as far as the periphery thereof (the region of its perimeter 206), conformal contact between the functional film 202 and the curved face 207 of the substrate 203.

In order to do this, the command and control unit is configured to act on the lift system 270 to move its mobile part 274 and, therefore, the first support plate 276, on the mobile plate 275, with respect to its fixed part 273 and, therefore, with respect to the second support plate 277; so as to move the device 223, and therefore the substrate 203, in a vertical translational movement toward the bowl 350 and, therefore, toward the film 202.

The movement of the shell 332 of the device 223 causes the mobile piston 335 to move from its extended position to an intermediate or semi-retracted position, with the annular sealing ring 333 remaining in contact with the second seal 354 of the washer 353 of the device 224.

The command and control unit is configured to move the mobile part 274 of the lift system 270 in a controlled manner, for example at a constant predetermined closing speed between the bowl 350 and the device 223, notably a closing speed of the order for example of 0.05 to 20 millimeters/second, preferably of the order of 0.3 to 0.5 millimeters/second.

The application of the film 202 to the substrate 203 and the inversion of the curvature of the film 202 intrinsically generates a pressure in the first chamber 234, which pressure is controlled and regulated to, for example, 0.25 bar in the same way as was indicated above; and, furthermore, at the end of the lamination step (at the end of the inversion of the curvature of the film) the pressure can be controlled and regulated in such a way as to be comprised for example between 0 and 5 bar, preferably comprised between 1.5 and 3.5 bar, for a duration for example comprised between 30 seconds and 10 minutes.

Figure 23:
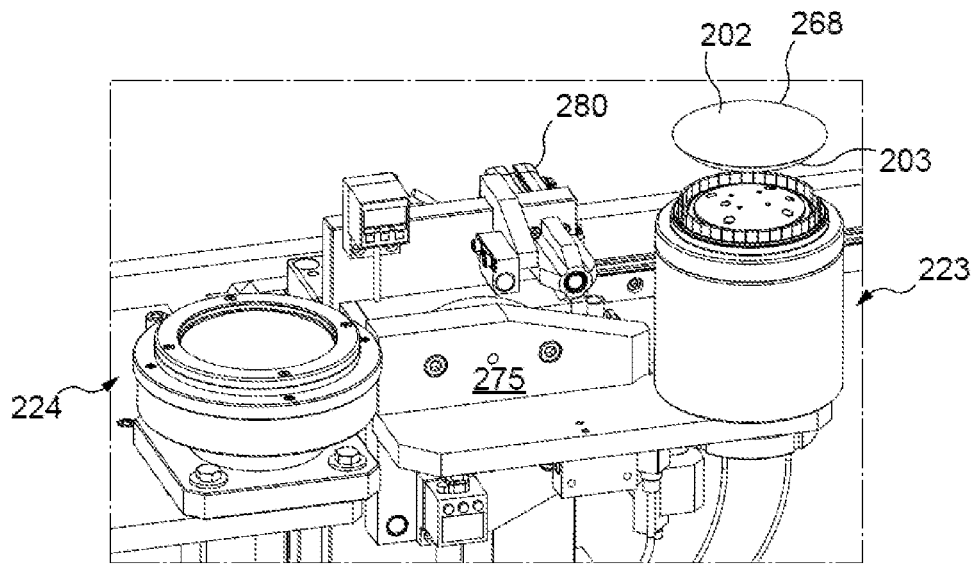
FIG. 23 is a view similar to that of FIG. 15, once the film has been transferred to the substrate.

In FIG. 23, the machine 200 is once again in its rest configuration and the assembly made up of the preformed functional film 202 and of the substrate 203 forms an ophthalmic lens 268.

In order to achieve that, the finger 283 of the locking actuator 280 has been removed from the orifice 279 in the mobile plate 275 and the latter has been actuated to make it return with the laminated assembly to its first position in which the first support plate 276 comes into contact and abutment with the second position detector 286, and with the stop member 289; and the ophthalmic lens 268 thus formed has been removed from the collar 334 of the device 223.

The transferral of the film 2, 102 or 202 described hereinabove is performed directly onto the curved face 7, 107 207 of the substrate 3, 103 or 203.

The curved face may exhibit an initial layer formed of a material exhibiting adhesive properties, onto which the film is transferred.

Within the context of the invention, it must be understood that the curved face of the substrate is either bare, or coated with adhesive, or may already have an initial film or an initial coating, or even several, on the bare and/or adhesive-coated face.

The transferred film may therefore be brought into contact with the initial adhesive layer and/or with an initial film/coating on the substrate.

Such an initial film/coating is applied to at least one of the faces of the substrate and is configured to confer upon it at least one function chosen for example from among those mentioned hereinabove regarding the preformed functional film that is being transferred.

Figure 24:
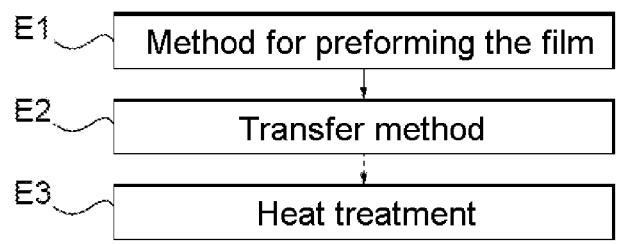
FIGS. 24 and 25 are block diagrams illustrating various steps in methods for the manufacture of ophthalmic lenses, each implementing a transfer method using one of the machines of FIGS. 1 to 23.
Figure 25:
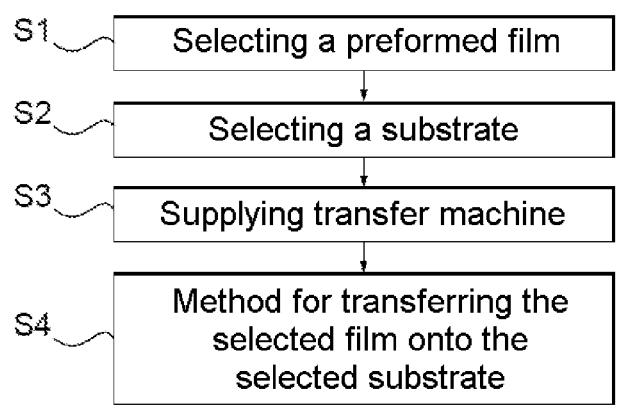

FIGS. 24 and 25 are block diagrams illustrating various steps in methods for the manufacture of ophthalmic lenses 68, 168, 268, each implementing in particular a transfer method using one of the machines 1, 100 and 200 described hereinabove.

In FIG. 24, the method for manufacturing ophthalmic lenses 68, 168, 268 comprises a method E1 of preforming a functional film 2, 102, 202, notably by thermoforming, in order to give the functional film a curvature; then a method E2 of transferring the preformed functional film 2, 102, 202 onto the ophthalmic substrate 3, 103, 203 in accordance with the description given hereinabove, using one of the machines 1, 100, 200, and the steps of which method can be implemented at ambient temperature, so as to obtain the ophthalmic lens; followed by heat treatment E3 of the ophthalmic lens 68, 168, 268 obtained at the end of the transfer method, for example an annealing.

It will be noted that the steps in the transfer method correspond to the various configurations of the transfer machine, namely the steps of loading, clamping, inverting, pre-lamination, lamination and removal of the transfer method correspond respectively to the rest, clamping, inverting, pre-lamination, lamination and also rest configurations of the machines.

The transfer machine according to the invention is particularly advantageous when the ophthalmic lens thus formed needs to undergo a heat treatment subsequent to the transferral. Specifically, during a heat treatment of such an assembly that makes up a lens, the temperature of the substrate increases and, when its temperature approaches a glass transition temperature of the material from which the substrate is made, the latter softens so that it then puts up little if any resistance to any residual stresses present in the assembly (film/substrate) formed. The softness of the substrate means that the residual stresses present in the assembly can relax thus leading to a slight deformation of the substrate, for example a small amount of twisting. Such deformation may lead to a small optical defect or even to a small change in the optical function of the lens. Now, the machines described hereinabove make it possible to limit the formation of such stresses, particularly thanks to the accurate positioning and alignment of the film and of the substrate and also thanks to the controlled movement during application of the film.

In FIG. 25 the method for manufacturing ophthalmic lenses 68, 168, 268 comprises a step S1 of selecting the preformed functional film 2, 102, 202 from a plurality of preformed functional films, a step S2 of selecting the ophthalmic substrate 3, 103, 203 from a plurality of substrates and a step S3 of supplying the transfer machine 1, 100, 200 for implementing said method of transferring the selected preformed functional film onto the curved face of the selected substrate.

In alternative forms of embodiment which have not been illustrated, the application of a positive pressure difference to the first chamber is merely optional and/or may be performed more generally before or during the lamination and/or pre-lamination step, and may last for the entire duration or only part of the duration of the lamination.

It is recalled more generally that the invention is not limited to the examples described and shown.

The invention claimed is:

1. A machine for transferring a preformed functional film onto a curved face of an ophthalmic substrate, comprising:
   a first receiving device configured to receive and hold the substrate in a first predetermined position;
   a second receiving device, distinct from the first receiving device and configured to receive the preformed functional film in a second predetermined position; the first receiving device and/or the second receiving device configured to hold the preformed functional film in its second predetermined position and to apply a predetermined pressure force to the entire perimeter of the functional film;
   a first movement mechanism for moving at least one of the first and second receiving devices, configured to place the curved face of the ophthalmic substrate facing the preformed functional film, with respective geometric centers of the ophthalmic substrate and of the preformed functional film aligned;
   a second movement mechanism for moving at least of the first and second receiving devices, configured to bring the center of the preformed functional film into contact with the center of the curved face of the substrate and then apply the functional film to the ophthalmic substrate to spread, radially from the center of the functional film to the periphery thereof, a conformal contact between the functional film and the curved face of the substrate; and
   a command and control unit configured to control at least the second movement mechanism when the functional film and the ophthalmic substrate are in contact.

2. The machine as claimed in claim 1, wherein the second receiving device and the preformed functional film held in its second predetermined position delimit a first closed and sealed chamber, and the machine further comprises:
   a system configured to generate a positive pressure difference within the first chamber in relation to its immediate surroundings, to place the preformed functional film under tension.

3. The machine as claimed in claim 1, wherein the second receiving device has a horizontal base on which the functional film rests along its perimeter and a clamping mechanism configured to apply the predetermined pressure force vertically and uniformly to the perimeter of the functional film.

4. The machine as claimed in claim 3, wherein the clamping mechanism is formed by a plurality of articulated arms each including an end gripper, configured to grip the perimeter of the functional film on the base; or by an at least partially annular member configured to be mounted so that it presses firmly against the base.

5. The machine as claimed in claim 1, wherein the first and second receiving devices are configured to keep the preformed functional film in its second predetermined position and to define, when the preformed functional film is facing the curved face of the substrate, a second closed and sealed chamber delimited notably by the curved face of the substrate and one face of the preformed functional film which face faces toward the curved face of the substrate, and the machine further comprises:

a system configured to generate a negative pressure difference within the second chamber in relation to the first chamber.

6. The machine as claimed in claim 1, wherein the second movement mechanism is configured to apply the functional film to the ophthalmic substrate by revering the curvature of the functional film to spread, radially from the center of the functional film as far as the periphery thereof, the conformal contact between the functional film and the curved face of the substrate.

7. The machine as claimed in claim 1, wherein the first and second receiving devices are configured so that the curved face of the substrate and one face of the functional film to be applied to the curved face of the substrate face in a same axial direction when the substrate and the functional film are respectively in the first and second predetermined positions, before they are brought to face one another, and the first movement mechanism is configured to turn at least one of the first and second receiving devices over to position it facing the other of the first and second receiving devices and thus place the curved face of the ophthalmic substrate so that it faces the face of the preformed functional film that is intended to be applied to the curved face of the substrate.

8. The machine as claimed in claim 1, wherein at least one of the first and second receiving devices comprises a centering mechanism for automatically centering the substrate and/or the functional film in the first and/or the second predetermined position respectively.

9. A method for manufacturing an ophthalmic lens comprising a substrate and a functional film which is preformed and bonded to a curved face of the substrate, the method of manufacture comprising a method for transferring the preformed functional film which is carried out using a transfer machine as claimed in claim 1, the transfer method comprising the following steps:

mounting and holding the substrate in a first predetermined position on a first receiving device of the machine;

mounting the preformed functional film in a second predetermined position on a second receiving device of the machine and holding it while applying a predetermined pressure force to an entire perimeter of the functional film due to the first receiving device and/or to the second receiving device;

positioning the curved face of the substrate to face the preformed functional film with a first movement mechanism that moves at least one of the first and second receiving devices of the machine, with respective geometric centers of the substrate and of the preformed functional film aligned;

bringing the center of the preformed functional film into contact with the center of the curved face of the substrate; and applying the functional film to the ophthalmic substrate in such a way as to spread, radially from the center of the functional film as far as the periphery thereof, conformal contact between the functional film and the curved face of the substrate, using a second movement mechanism of at least one of the first and second receiving devices of the machine, the bringing the center of the preformed functional film into contact with the center of the curved face of the substrate and the applying the functional film to the ophthalmic substrate being controlled by a command and control unit of the machine.

10. The method of manufacture as claimed in claim 9, wherein the second receiving device and the preformed functional film held in its second predetermined position delimit a first closed and sealed chamber, and the transfer method further comprises: generating a positive pressure difference within the first chamber in relation to its immediate surroundings, so as to place the preformed functional film under tension.

11. The method of manufacture as claimed in claim 10, wherein the positive pressure difference within the first chamber in relation to its immediate surroundings is comprised between 0.1 and 1 bar.

12. The method of manufacture as claimed in claim 9, wherein the second receiving device has a horizontal base on which the functional film rests along its perimeter and the step of holding the functional film in its second predetermined position is performed by applying the predetermined pressure force vertically to the perimeter of the functional film with a mechanism for clamping the second receiving device.

13. The method of manufacture as claimed in claim 9, wherein the first and second receiving devices are configured to keep the preformed functional film in its second predetermined position and to define, when the preformed functional film is facing the curved face of the substrate, a second closed and sealed chamber, delimited notably by the curved face of the substrate and one face of the preformed functional film which face faces toward the curved face of the substrate, and the transfer method further comprises:

generating a negative pressure difference within the second chamber in relation to the first chamber.

14. The method of manufacture as claimed in claim 13, wherein the negative pressure difference within the second chamber in relation to the first chamber is comprised between 0.1 and 1 bar.

15. The method of manufacture as claimed in claim 9, wherein the applying the film to the substrate is performed by reversing the curvature of the functional film so as to spread, radially from the center of the functional film as far as the periphery thereof, the conformal contact between the functional film and the curved face of the substrate.

16. The method of manufacture as claimed in claim 9, wherein the steps of mounting the substrate and the functional film respectively on the first and second receiving devices are performed such that the curved face of the substrate and one face of the functional film to be applied to the curved face of the substrate face in a same axial direction, and the placing the curved face of the ophthalmic substrate so that it faces the face of the preformed functional film that is to be applied to the curved face of the substrate is performed by inverting at least one of the first and second receiving devices.

17. The method of manufacture as claimed in claim 9, wherein the applying the film to the substrate is performed in a controlled manner at a constant predetermined closing speed between the first and second receiving devices, at a closing speed of the order of 0.05 to 20 millimeters/second.

18. The method of manufacture as claimed in claim 9, further comprising, after the applying the functional film to the ophthalmic substrate, applying, within the first chamber, a pressure between 0 and 5 bar, for a duration comprised between 30 seconds and 10 minutes.

\* \* \* \* \*